(12) United States Patent
Yang et al.

(10) Patent No.: US 10,470,140 B2
(45) Date of Patent: Nov. 5, 2019

(54) POWER HEADROOM REPORT FOR UPLINK SPLIT BEARER COMMUNICATIONS

(71) Applicant: QUALCOMM Incorporated, San Diego, CA (US)

(72) Inventors: Yue Yang, San Diego, CA (US); Aziz Gholmieh, Del Mar, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/880,220

(22) Filed: Jan. 25, 2018

(65) Prior Publication Data

US 2018/0324714 A1    Nov. 8, 2018

Related U.S. Application Data

(60) Provisional application No. 62/501,581, filed on May 4, 2017.

(51) Int. Cl.
*H04W 72/10* (2009.01)
*H04W 52/36* (2009.01)
(Continued)

(52) U.S. Cl.
CPC ....... *H04W 52/365* (2013.01); *H04W 52/146* (2013.01); *H04W 52/34* (2013.01);
(Continued)

(58) Field of Classification Search
CPC . H04W 52/365; H04W 52/146; H04W 52/34; H04W 52/367; H04W 72/10; H04W 72/0473
(Continued)

(56) References Cited

U.S. PATENT DOCUMENTS 5,987,326 A * 11/1999 Tiedemann, Jr. ..... H04W 52/40
370/331
6,515,377 B1 * 2/2003 Ubelein ................. B60J 7/0573
307/10.1
(Continued)

FOREIGN PATENT DOCUMENTS

WO    WO-2015020363 A1    2/2015
WO    WO-2015093768 A1    6/2015

OTHER PUBLICATIONS

International Search Report and Written Opinion—PCT/US2018/026020—ISA/EPO—dated Jul. 6, 2018.

*Primary Examiner* — Hai V Nguyen
(74) *Attorney, Agent, or Firm* — Holland & Hart LLP

(57) ABSTRACT

Methods, systems, and devices for wireless communication are described. A user equipment (UE) may transmit a power headroom report (PHR) to a first base station on a first link of a split bearer and to a second base station on a second link of the split bearer. The UE may evaluate a characteristic associated with the first link or the second link after transmitting the first PHR, and adjust a transmit power value transmitted in the PHR associated with the first link or the second link, or both based on the evaluation. As a result, the UE may transmit an adjusted PHR to the first base station or the second base station, or both.

30 Claims, 14 Drawing Sheets

(51) Int. Cl.
*H04W 52/34* (2009.01)
*H04W 52/14* (2009.01)
*H04W 72/04* (2009.01)

(52) U.S. Cl.
CPC ......... *H04W 52/367* (2013.01); *H04W 72/10* (2013.01); *H04W 72/0473* (2013.01)

(58) Field of Classification Search
USPC .......................................... 455/522; 370/252
See application file for complete search history.

(56) References Cited

U.S. PATENT DOCUMENTS

| | | | | |
|---|---|---|---|---|
| 6,697,644 | B2* | 2/2004 | Scherzer | H04W 16/28 455/446 |
| 7,194,281 | B2* | 3/2007 | Peng | H04W 36/18 370/318 |
| 8,725,193 | B2* | 5/2014 | Immonen | H04W 52/367 455/522 |
| 8,755,832 | B2* | 6/2014 | Baldemair | H04W 52/367 455/522 |
| 8,897,237 | B2* | 11/2014 | Cui | H04W 72/1247 370/313 |
| 9,282,523 | B2* | 3/2016 | Yu | H04L 5/00 |
| 9,398,630 | B2* | 7/2016 | Zou | H04W 72/042 |
| 9,521,632 | B2* | 12/2016 | Narasimha | H04W 52/365 |
| 9,603,099 | B2* | 3/2017 | Shin | H04W 52/08 |
| 9,635,672 | B2* | 4/2017 | Vasudevan | H04W 76/14 |
| 9,686,758 | B2* | 6/2017 | Aiba | H04W 72/04 |
| 9,699,779 | B2* | 7/2017 | Marinier | H04W 72/044 |
| 9,763,199 | B2* | 9/2017 | Pelletier | H04W 52/146 |
| 9,787,456 | B2* | 10/2017 | Tan Bergstrom | H04L 5/001 |
| 9,807,709 | B2* | 10/2017 | Deng | H04W 92/18 |
| 9,883,419 | B2* | 1/2018 | Basu Mallick | H04W 28/085 |
| 9,894,702 | B2* | 2/2018 | Mishra | H04W 36/08 |
| 9,961,648 | B2* | 5/2018 | Kwon | H04W 52/365 |
| 9,999,007 | B2* | 6/2018 | Chen | H04W 52/365 |
| 10,057,861 | B2* | 8/2018 | Chen | H04L 43/08 |
| 10,057,916 | B2* | 8/2018 | Barabell | H04B 17/318 |
| 10,143,009 | B2* | 11/2018 | Prateek | H04W 74/08 |
| 10,178,632 | B2* | 1/2019 | Loehr | H04W 4/70 |
| 10,271,288 | B2* | 4/2019 | Pelletier | H04W 52/146 |
| 2002/0146983 | A1* | 10/2002 | Scherzer | H04W 16/28 455/67.11 |
| 2004/0203782 | A1* | 10/2004 | Peng | H04W 36/18 455/436 |
| 2009/0093255 | A1* | 4/2009 | Balasubramanian | H04W 72/042 455/450 |
| 2011/0212739 | A1* | 9/2011 | Pedersen | H04J 11/0056 455/501 |
| 2011/0310760 | A1* | 12/2011 | Wu | H04W 72/0413 370/252 |
| 2012/0082043 | A1* | 4/2012 | Hwang | H04L 5/001 370/252 |
| 2012/0113915 | A1* | 5/2012 | Chen | H04W 52/365 370/329 |
| 2012/0127933 | A1* | 5/2012 | Worrall | H04W 52/367 370/329 |
| 2012/0147801 | A1* | 6/2012 | Ho | H04W 52/365 370/311 |
| 2012/0172079 | A1* | 7/2012 | Baldemair | H04W 52/367 455/522 |
| 2012/0178494 | A1* | 7/2012 | Haim | H04W 52/365 455/522 |
| 2012/0207112 | A1* | 8/2012 | Kim | H04W 52/146 370/329 |
| 2012/0224552 | A1* | 9/2012 | Feuersanger | H04L 5/0007 370/329 |
| 2012/0275391 | A1* | 11/2012 | Cui | H04W 72/1247 370/329 |
| 2013/0039314 | A1* | 2/2013 | Prateek | H04W 74/08 370/329 |
| 2013/0044621 | A1* | 2/2013 | Jung | H04W 72/082 370/252 |
| 2013/0215786 | A1* | 8/2013 | Breuer | H04B 1/7097 370/252 |
| 2013/0250925 | A1* | 9/2013 | Lohr | H04W 72/0446 370/336 |
| 2013/0324182 | A1* | 12/2013 | Deng | H04W 92/18 455/522 |
| 2014/0029586 | A1* | 1/2014 | Loehr | H04W 56/0005 370/336 |
| 2014/0044024 | A1* | 2/2014 | Zou | H04W 72/042 370/280 |
| 2014/0056278 | A1* | 2/2014 | Marinier | H04W 72/044 370/330 |
| 2014/0064129 | A1* | 3/2014 | Sane | H04W 24/10 370/252 |
| 2014/0153509 | A1* | 6/2014 | Guo | H04W 48/16 370/329 |
| 2014/0219234 | A1 | 8/2014 | Kim et al. | |
| 2014/0241301 | A1* | 8/2014 | Nakashima | H04W 52/365 370/329 |
| 2014/0321304 | A1* | 10/2014 | Yu | H04L 5/00 370/252 |
| 2014/0349696 | A1* | 11/2014 | Hyde | H04W 24/02 455/517 |
| 2015/0163789 | A1* | 6/2015 | Vasudevan | H04W 76/14 370/259 |
| 2015/0181539 | A1* | 6/2015 | Aiba | H04W 72/04 370/329 |
| 2015/0195795 | A1* | 7/2015 | Loehr | H04W 52/06 455/522 |
| 2015/0271761 | A1* | 9/2015 | Park | H04W 52/146 370/329 |
| 2015/0350944 | A1* | 12/2015 | Chen | H04L 43/08 370/252 |
| 2016/0037550 | A1* | 2/2016 | Barabell | H04B 17/318 455/450 |
| 2016/0066284 | A1* | 3/2016 | Kwon | H04W 52/365 370/329 |
| 2016/0198421 | A1* | 7/2016 | Yi | H04W 52/365 370/329 |
| 2016/0234714 | A1* | 8/2016 | Basu Mallick | H04W 28/085 |
| 2016/0338137 | A1* | 11/2016 | Mishra | H04W 36/08 |
| 2017/0013565 | A1* | 1/2017 | Pelletier | H04W 52/146 |
| 2017/0215156 | A1* | 7/2017 | Chen | H04W 52/365 |
| 2017/0230913 | A1* | 8/2017 | Ouchi | H04W 52/34 |
| 2017/0265176 | A1* | 9/2017 | Marinier | H04W 72/044 |
| 2017/0310433 | A1* | 10/2017 | Dinan | H04W 72/048 |
| 2017/0331577 | A1* | 11/2017 | Parkvall | H04J 11/0079 |
| 2017/0331670 | A1* | 11/2017 | Parkvall | H04W 52/0274 |
| 2017/0353932 | A1* | 12/2017 | Sorrentino | H04W 52/367 |
| 2018/0014255 | A1* | 1/2018 | Pelletier | H04W 52/146 |
| 2018/0014265 | A1* | 1/2018 | Deng | H04W 92/18 |
| 2018/0124648 | A1* | 5/2018 | Park | H04W 36/0072 |
| 2018/0139646 | A1* | 5/2018 | Basu Mallick | H04W 28/085 |
| 2018/0160379 | A1* | 6/2018 | Yokomakura | H04W 52/365 |
| 2018/0352561 | A1* | 12/2018 | Barabell | H04B 17/318 |
| 2019/0116611 | A1* | 4/2019 | Lee | H04W 72/1278 |

* cited by examiner

POWER HEADROOM REPORT FOR UPLINK SPLIT BEARER COMMUNICATIONS

CROSS REFERENCES

The present Application for Patent claims priority to U.S. Provisional Patent Application No. 62/501,581 by Yang, et al., entitled "POWER HEADROOM REPORT FOR UPLINK SPLIT BEARER COMMUNICATIONS," filed May 4, 2017, assigned to the assignee hereof.

INTRODUCTION

The following relates generally to wireless communication, and more specifically to power headroom report for uplink (UL) split bearer communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A UE may be configured with a dual-connectivity. That is, the UE may be connected simultaneously to two or more base stations, and be communicating with the base stations using a split bearer. For example, a UE may be configured to transmit data to one base station while transmitting different or related data to a different base station. In some cases, the UE may be constrained by a maximum transmit power affecting some or all UL communications. The UE may transmit a power headroom report (PHR) to each of the connected base stations using its configured maximum transmit power. The configured maximum transmit power is based on an overall transmission power value and a static split ratio value. The connected base stations may allocate additional radio resources to the UE based on the PHR. However, PHR reporting by a UE based on a static split ratio may adversely impact performance of the UE, for example, by preventing the UE from allocating transmit power to a link that may be communicating resource extensive data traffic.

SUMMARY

A method of wireless communication at a UE is described. The method may include transmitting a first power headroom report (PHR) to a first base station on a first link of a split bearer and to a second base station on a second link of the split bearer, evaluating a characteristic associated with the first link or the second link after transmitting the first PHR, adjusting a transmit power value transmitted in the first PHR associated with the first link or the second link, or both based at least in part on the evaluating, and transmitting an adjusted PHR to the first base station or the second base station, or both based at least in part on the evaluating.

An apparatus for wireless communication is described. The apparatus may include means for transmitting a first PHR to a first base station on a first link of a split bearer and to a second base station on a second link of the split bearer, means for evaluating a characteristic associated with the first link or the second link after transmitting the first PHR, means for adjusting a transmit power value transmitted in the first PHR associated with the first link or the second link, or both based at least in part on the evaluating, and means for transmitting an adjusted PHR to the first base station or the second base station, or both based at least in part on the evaluating.

Another apparatus for wireless communication is described. The apparatus may include a processor and memory in electronic communication with the processor. The processor and memory may be configured to transmit a first PHR to a first base station on a first link of a split bearer and to a second base station on a second link of the split bearer, evaluate a characteristic associated with the first link or the second link after transmitting the first PHR, adjust a transmit power value transmitted in the first PHR associated with the first link or the second link, or both based at least in part on the evaluating, and transmit an adjusted PHR to the first base station or the second base station, or both based at least in part on the evaluating.

A non-transitory computer readable medium for wireless communication is described. The non-transitory computer-readable medium may include instructions operable to cause a processor to transmit a first PHR to a first base station on a first link of a split bearer and to a second base station on a second link of the split bearer, evaluate a characteristic associated with the first link or the second link after transmitting the first PHR, adjust a transmit power value transmitted in the first PHR associated with the first link or the second link, or both based at least in part on the evaluating, and transmit an adjusted PHR to the first base station or the second base station, or both based at least in part on the evaluating.

Some examples of the method, apparatus, and non-transitory computer-readable medium described above may further include processes, features, means, or instructions for identifying a type of data scheduled for transmission, identifying a transmission duration of data scheduled for transmission, identifying a priority of data scheduled for transmission, or identifying a combination thereof. Some examples of the method, apparatus, and non-transitory computer-readable medium described above may further include processes, features, means, or instructions for configuring an available transmit power value associated with the first link or the second link, or both based at least in part on the identifying.

Some examples of the method, apparatus, and non-transitory computer-readable medium described above may further include processes, features, means, or instructions for generating the adjusted PHR based at least in part on the available transmit power value and a transmit power value condition associated with scheduled data traffic for an upcoming UL (UL) transmission, wherein transmitting the adjusted PHR is based at least in part on the generating. Some examples of the method, apparatus, and non-transitory computer-readable medium described above may further include processes, features, means, or instructions for adjusting a transmit power level associated with the first link or the second link, or both for the scheduled data traffic based at least in part on the configuring.

Some examples of the method, apparatus, and non-transitory computer-readable medium described above may further include processes, features, means, or instructions for receiving from the first base station or the second base station, or both an UL grant comprising radio resources based at least in part on the adjusted PHR. In some examples of the method, apparatus, and non-transitory computer-readable medium described above, the received UL grant indicates a decrease in allocation of radio resources associated with the first link or the second link, or both based at least in part on the adjusted PHR. In some examples of the method, apparatus, and non-transitory computer-readable medium described above, the received UL grant indicates an increase in allocation of radio resources associated with the first link or the second link, or both based at least in part on the adjusted PHR.

A method for wireless communication is described. The method may include receiving a first PHR from a UE at a first time, transmitting an UL grant comprising radio resources based at least in part on the first PHR, receiving an adjusted PHR from the UE at a second time different from the first time, and transmitting an adjusted UL grant comprising radio resources based at least in part on the adjusted PHR.

An apparatus for wireless communication is described. The apparatus may include means for receiving a first PHR from a UE at a first time, means for transmitting an UL grant comprising radio resources based at least in part on the first PHR, means for receiving an adjusted PHR from the UE at a second time different from the first time, and means for transmitting an adjusted UL grant comprising radio resources based at least in part on the adjusted PHR.

Another apparatus for wireless communication is described. The apparatus may include a processor and memory in electronic communication with the processor. The processor and memory may be configured to receive a first PHR from a UE at a first time, transmit an UL grant comprising radio resources based at least in part on the first PHR, receive an adjusted PHR from the UE at a second time different from the first time, and transmit an adjusted UL grant comprising radio resources based at least in part on the adjusted PHR.

A non-transitory computer readable medium for wireless communication is described. The non-transitory computer-readable medium may include instructions operable to cause a processor to receive a first PHR from a UE at a first time, transmit an UL grant comprising radio resources based at least in part on the first PHR, receive an adjusted PHR from the UE at a second time different from the first time, and transmit an adjusted UL grant comprising radio resources based at least in part on the adjusted PHR.

In some examples of the method, apparatus, and non-transitory computer-readable medium described above, the adjusted UL grant indicates a decrease in allocation of radio resources associated with a link between the base station and the UE based at least in part on the adjusted PHR. In some examples of the method, apparatus, and non-transitory computer-readable medium described above, the adjusted UL grant indicates a decrease in allocation of radio resources associated with a link between the base station and the UE based at least in part on the adjusted PHR.

DETAILED DESCRIPTION

Figure 1:
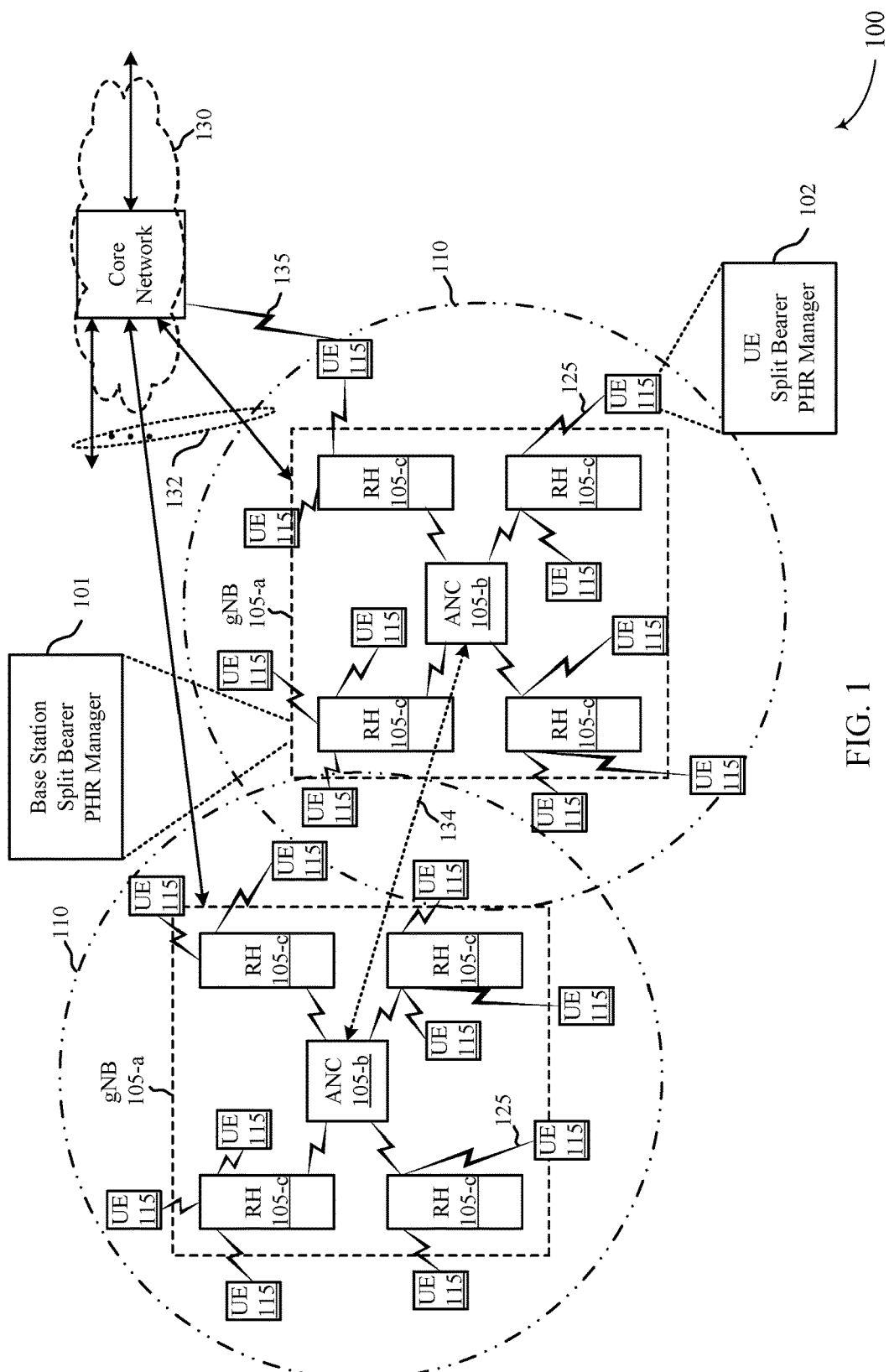
FIG. 1 illustrates an example of a system for wireless communication that supports power headroom report (PHR) for UL split bearer communications, in accordance with one or more aspects of the present disclosure.

Aspects of the present disclosure provide methods, systems, and devices for wireless communication that support power headroom reports (PHRs) for uplink (UL) split bearer communications. In a multi-connectivity wireless communication system, a user equipment (UE) may be configured with dual-connectivity. For instance, dual-connectivity may refer to the simultaneous connection of a wireless communications device, such as a UE, to two or more base stations (e.g., eNB, gNB), which may also be communicating with the base stations using a split bearer. Existing techniques enable the UEs to determine a maximum transmit power for communicating with a first base station and a second base station using split bearers. For example, the UE may be configured to use the determined maximum transmit power to report PHRs on links associated with both the first base station and the second base station. In such cases, the UEs may be constrained by the maximum transmit power.

The maximum transmit power may affect some or all UL communications in aggregate. The UE may transmit a PHR to each of the connected base stations using its configured maximum transmit power. The configured maximum transmit power may be based on an overall transmission power value and a static split ratio value. However, current techniques do not allow the UE to consider characteristics associated with the links while determining the maximum transmit power. For example, the UE fails to consider characteristics such as traffic types and traffic patterns on the links while determining the maximum transmit power. As a result, the UE allocates the same power to a higher priority traffic over a first link as well as a lower priority traffic over a second link. In some cases, the UE may transmit the higher priority traffic over the first link periodically or during a predetermined duration. In such cases, it is advantageous for the UE to allocate more transmit power to the first link periodically or during the predetermined duration. According to one or more aspects of the present disclosure, the UE may dynamically configure the maximum transmit power on one or more links based on characteristics associated with the one or more links. More specifically, the UE may determine the maximum transmit power based on the traffic type and traffic patterns associated with the one or more links. In some cases, the UE may then report corresponding PHRs associated with the one or more links in a semi-static and time-variant manner.

Connected base stations may allocate radio resources to the UE based on a received PHR. In some examples, the UE may consider additional characteristics to determine a maximum transmit power. That is, the UE may evaluate a characteristic of associated links of the connected base stations. For example, a UE may evaluate a characteristic associated with a link to a first base station (e.g., gNB) and a link to a second base station (e.g., eNB). The characteristic may include a type of data scheduled for transmission on a link, transmission duration of data scheduled for transmission on a link, or both. For example, a UE may determine that higher priority data traffic is scheduled for transmission on at least one link periodically or during a transmission duration. The UE may allocate additional transmit power on the at least one link during the scheduled duration of the higher priority data traffic. The UE may configure a maximum transmit power on associated links of the connected base stations, and report PHRs that are semi-static and time-variant based on evaluating the additional characteristics (e.g., data traffic type and patterns on connected links). Thus, the UE may be configured to dynamically allocate power to links used to report PHRs based on characteristics of the links.

Aspects of the disclosure are initially described in the context of a wireless communications system. Exemplary UEs, base stations (e.g., eNB, gNB), systems, and process flow for power headroom reporting for UL split bearer communications are then described. Aspects of the disclosure are further illustrated by and described with reference to apparatus diagrams, system diagrams, and flowcharts that relate to power headroom report for UL split bearer communications.

FIG. 1 illustrates an example of a system 100 for wireless communication that supports PHR for UL split bearer communications, in accordance with one or more aspects of the present disclosure. The system 100 for wireless communication includes base stations 105 (e.g., gNodeBs (gNBs)), and/or radio heads (RHs)), UEs 115, and a core network 130. In some examples, the system 100 for wireless communication may be a LTE, LTE-Advanced (LTE-A) network, or a NR network. In some cases, system 100 for wireless communication may support enhanced broadband communications, ultra-reliable (i.e., mission critical) communications, low latency communications, and communications with low-cost and low-complexity devices.

In accordance with the present disclosure, UEs 115 may establish one or more connections with base stations 105. As part of establishing the connection with one or more base stations 105, each of the connected base stations may indicate a transmit power value (e.g., transmit power level) to UE 115. For example, UE 115 may establish a dual-connection with two base stations 105 using a split bearer. UE 115 may transmit an indication of available transmit power to each of the connected base stations 105. Each of the base stations 105 may analyze a condition or parameter of a link between the respective base station 105 and UE 115. Based on the analyzed condition or parameter, each of the base stations 105 may assign an UL grant to UE 115. The condition may include a path loss or interference, or both in a communication medium. Additionally, the parameter may include a received signal strength indicator (RSSI). The UL grant may indicate assigned radio resources. An UL grant may also indicate the transmit power level for UE 115 to use when communicating with base stations 105, as described above. For example, an UL grant received from a first base station 105 may indicate that UE 115 may allocate a transmit power level of 15 watts (W) for transmissions to the first base station 105, while an UL grant received from a second base station 105 may indicate that UE 115 may allocate a transmit power level of 5 W for transmissions to the second base station 105.

UEs 115 may transmit PHRs to base stations 105 to configure (e.g., maintain or adjust) a transmit power value/level. UEs 115 may transmit a PHR to a first base station 105 on a first link of a split bearer and to a second base station 105 on a second link of a split bearer. In some cases, UE 115 may transmit a PHR to a base station 105 within a medium access control (MAC) control element (CE). The PHR may indicate to base station 105 an available transmit power level of the UE 115. In other words, the PHR may indicate to base station 105 how much transmission power remains accessible by UE 115. As provided in the example above, the first base station 105 may indicate to UE 115 to allocate a transmit power level of 15 W for UL transmission to the first base station. However, UE 115 may have allocated 20 W for the UL transmission. As a result, the PHR may indicate a transmit power value of 5 W. That is, UE 115 may indicate to the first base station 105 5 W of available transmit power.

UE 115, in some cases, may transmit a PHR to each of the connected base stations 105 using a default configured maximum transmit power. The configured maximum transmit power may be based on an overall transmission power value and a static split ratio value. The overall transmission power value may be a maximum transmit power level capability of UE 115. For example, UE 115 may have maximum transmit power capability of n Watts (W) (where n is an integer), for UL transmission. UE 115 may allocate a transmit power proportionally among links based on a static split ratio. For instance, UE 115 may have a dual-connection including a first link to a first base stations 105 and a second link to a second base station 105. In the case that the maximum transmit power is 10 W, UE 115 may allocate 5 W for the first link and 5 W for the second link. The connected base stations 105 may allocate radio resources to UE 115 based on the PHR, accordingly. UE 115 may improve allocation of transmit power on a link by considering additional characteristics to determine the transmit power for UL transmission on a link between UE 115 and base station 105.

In some cases, UE 115 may evaluate a characteristic of associated links between itself and connected base stations 105. The characteristic may include a type of data scheduled for transmission on a link, transmission duration of data scheduled for transmission on a link, or both. For example, UE 115 may determine that a higher priority data traffic is scheduled for transmission, on the first link associated with the first base station 105, periodically or during a transmission duration. Additionally, UE 115 may determine that a lesser priority data traffic is scheduled for transmission on the second link associated with the second base station 105. As such, UE 115 may allocate additional transmit power for the first link during the scheduled duration. Alternatively, UE 115 may determine that the type of data scheduled for transmission on the second link is more resource extensive than the type of data scheduled for transmission on the first link. For example, UE 115 may be scheduled to transmit resource extensive data, such as broadband type data, to the second base station 105 as compared to being scheduled to transmit less resource extensive data, such as data utilizing lesser bandwidth than broadband type data, to the first base station 105. In response, the UE 115 may allocate additional transmit power to the second link associated with the second base station 105.

Adjusting an allocation of transmit power on a link may include UE 115 transmitting an adjusted PHR to the first base station 105 or the second base station 105, or both. UE 115 may adjust a transmit power value transmitted in the initial PHR associated with the first link or the second link, or both based on the adjustment of the transmit power. In the case above, where the first link has higher priority data traffic scheduled compared to the second link, UE 115 may indicate a change in the transmission power remaining accessible by UE 115. For example, UE 115 may initially have allocated 10 W for UL transmission on the first link and 10 W for the second link. Since, UE 115 has higher priority data traffic scheduled on the first link, UE 115 may adjust the transmit power for UL transmission on the first link to 15 W. UE 115 may indicate this transmit power value in an adjusted PHR transmitted to the first base station 105. As a result, the first base station 105 may allocate additional radio resources (e.g., radio blocks, bandwidth) to the UE 115 for the first link. For instance, the first base station 105 may transmit an UL grant including radio resources to the UE 115. The UL grant may indicate an increase in allocation of radio resources associated with the first link.

Additionally or alternatively, UE 115 may adjust the transmit power for UL transmission on the second link in response to adjusting the transmit power on the first link. The adjustment of the transmit power on the second link may also be indicated, in the adjusted PHR that UE 115 transmits to the second base station 105. The second base station 105 may also transmit an UL grant including radio resources to the UE 115. The UL grant may indicate a decrease in allocation of radio resources associated with the second link. As such, UE 115 may configure a maximum transmit power on associated links of connected base stations 105, and report PHRs that are semi-static and time-variant based on evaluating the additional characteristics (e.g., data traffic type, data rate, data patterns, scheduled transmission).

Base stations 105 may wirelessly communicate with UEs 115 via one or more base station antennas. Each base station 105 may provide communication coverage for a respective geographic coverage area 110. Communication links 125 shown in system 100 for wireless communication may include UL transmissions from a UE 115 to a base station 105, or downlink (DL) transmissions, from a base station 105 to a UE 115. Control information and data may be multiplexed on an UL channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the system 100 for wireless communication, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105. A UE 115 may communicate with the core network 130 through communication link 135.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the base stations 105 (e.g., eNodeBs (eNBs, network access devices, gNBs) 105, gNBs, or access node controllers (ANCs) may interface with the core network 130 through backhaul links 132 (e.g., S1, S2, etc.) and may perform radio configuration and scheduling for communication with the UEs 115. In various examples, the ANCs may communicate, either directly or indirectly (e.g., through core network 130), with each other over backhaul links 134 (e.g., X1, X2, etc.), which may be wired or wireless communication links. Each ANC may additionally or alternatively communicate with a number of UEs 115 through a number of smart radio heads. In an alternative configuration of system 100 for wireless communication, the functionality of an ANC may be provided by a radio head or distributed across the radio heads of an eNB.

One or more of base stations 105 may include a base station split bearer PHR manager 101, which may receive a PHR from UE 115 at a first time, transmit an UL grant including radio resources based on the received PHR, receive an adjusted PHR from UE 115 at a second time different from the first time, and transmit an adjusted UL grant including radio resources based on the adjusted PHR.

UEs 115 may include a UE split bearer PHR manager 102, which may transmit a first PHR to a first base station 105 on a first link of a split bearer and to a second base station 105 on a second link of the split bearer, evaluate a characteristic associated with the first link or the second link after transmitting the first PHR, adjusting a transmit power value transmitted in the first PHR associated with the first link or the second link, or both based on the evaluating, and transmit an adjusted PHR to the first base station 105 or the second base station 105, or both based on the evaluating.

System 100 for wireless communication may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, system 100 for wireless communication may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, system 100 for wireless communication may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of system 100 for wireless communication may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, system 100 for wireless communication may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105, network device 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

System 100 for wireless communication may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more UL CCs for carrier aggregation. Carrier aggregation may be used with both FDD and TDD component carriers.

In some cases, system 100 for wireless communication may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, system 100 for wireless communication may utilize both licensed and unlicensed radio frequency spectrum bands. For example, system 100 for wireless communication may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, UL transmissions, or both. Duplexing in unlicensed spectrum may be based on frequency division duplexing (FDD), time division duplexing (TDD) or a combination of both.

Figure 2:
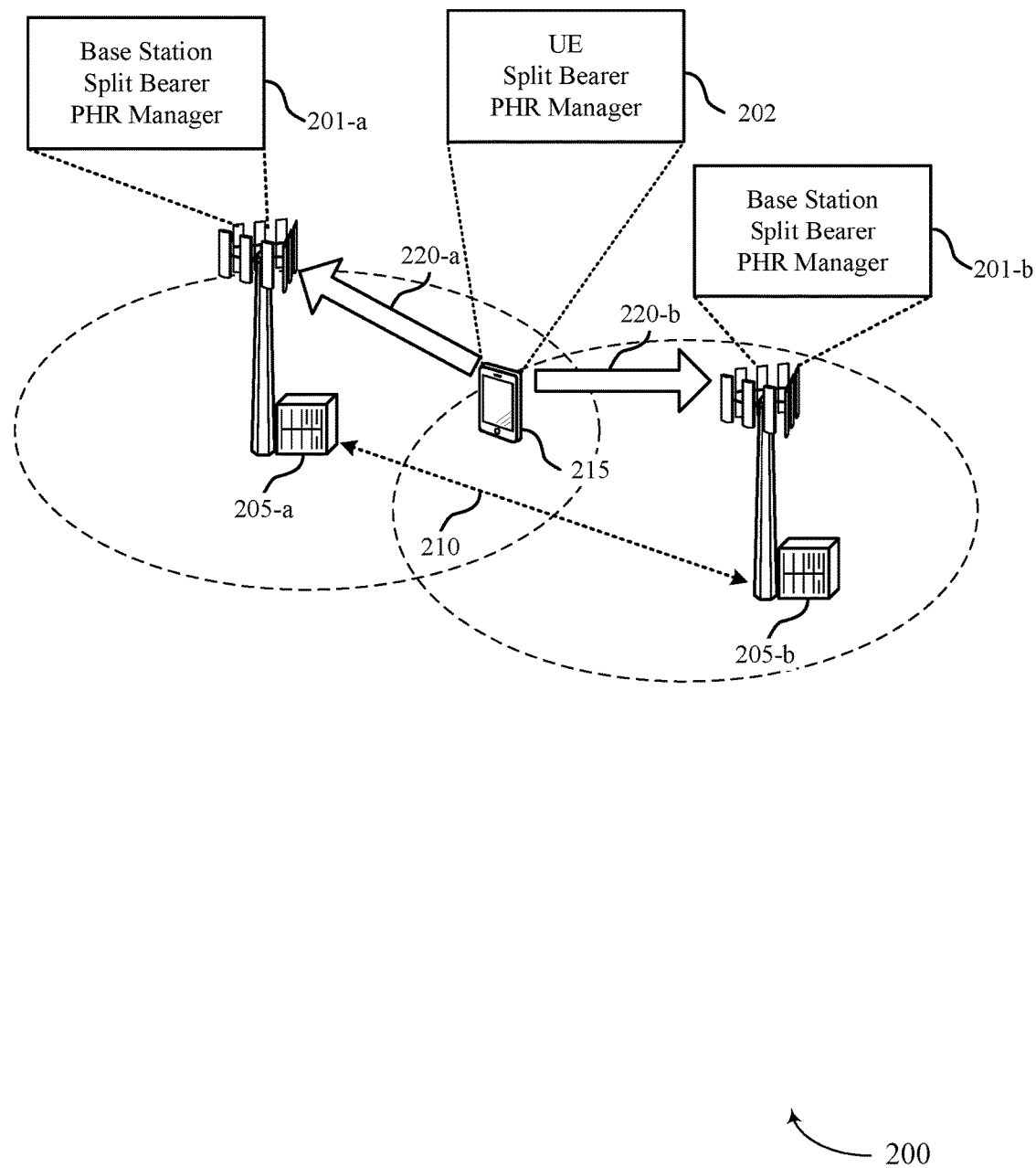
FIG. 2 illustrates an example of a system for wireless communication that supports PHR for UL split bearer communications, in accordance with one or more aspects of the present disclosure.

FIG. 2 illustrates an example of a system 200 for wireless communication that supports PHR for UL split bearer communications, in accordance with one or more aspects of the present disclosure. In some examples, system 200 may implement aspects of system 100. System 200 may include base station 205-a, base station 205-b, and UE 215, which may be examples of the corresponding devices described with reference to FIG. 1. System 200 may support PHR for UL split bearer communications to allow for efficient power use. Base station split bearer PHR manager 201-a and base station split bearer PHR manager 201-b may be an example of aspects of the base station split bearer PHR manager 101 described with reference to FIG. 1. UE split bearer PHR manager 202 may be an example of aspects of the UE split bearer PHR manager 102 described with reference to FIG. 1.

The UE 215 may establish a first link with the base station 205-a and a second link with the base station 205-b. As part of establishing the connection with the base station 205-a and the base station 205-b, each of base stations 205 may indicate a transmit power value (e.g., transmit power level) to UE 215. For example, UE 215 may establish a dual-connection with the base station 205-a and the base station 205-b using a split bearer. The UE 215 may transmit an indication of available transmit power to both the base station 205-a and the base station 205-b. In some cases, the base station 205-a and the base station 205-b may analyze a condition or parameter of the link (i.e., first link or second link). Based on the analyzed condition or parameter of the link, the base station 205-a and the base station 205-b may assign an UL grant to the UE 215.

In some embodiments, as part of analyzing the condition of a link, the base station 205-a and the base station 205-b may be configured to determine a path loss value in a communication medium (e.g., the first link or the second link) of system 200. In some examples, the base station 205-a and the base station 205-b may determine a level of interference for the link in the communication medium of system 200. Further. in some examples, the base station 205-a and the base station 205-b may determine the path loss value and the level of interference in the communication medium of the system 200. Additionally, the parameter may include a received signal strength indicator (RSSI), among others. The UL grant may indicate assigned radio resources. An UL grant may also indicate a transmit power level for the UE 215 to use when communicating with the base station 205-*a* and the base station 205-*b*. For example, an UL grant received from the base station 205-*a* may indicate to UE 215 to allocate a transmit power level of 15 W, while an UL grant received from the base station 205-*b* may indicate to the UE 215 to allocate a transmit power level of 5 W. The UE 215 may allocate an appropriate transmit power level based on the received indication from the base station 205-*a* or the base station 205-*b*, or both.

The UE 215 may transmit a PHR to the base station 205-*a* and the base station 205-*b* to configure a transmit power level. The UE 215 may transmit a PHR to the base station 205-*a* on the first link of a split bearer 220-*a* and to the base station 205-*b* on the second link of a split bearer 220-*b*. In some cases, the UE 215 may transmit a PHR to the base station 205-*a* and the base station 205-*b* within a MAC CE. The PHR may indicate to the base station 205-*a* and the base station 205-*b* an available transmit power level. As a result, the PHR may indicate to the base station 205-*a* and the base station 205-*b* how much transmission power remains accessible by the UE 215. As provided in the example above, the base station 205-*a* may indicate to the UE 215 to allocate a transmit power level of 15 W for UL transmission. However, the UE 215 may have originally allocated 20 W for UL transmission. As a result, the PHR may indicate a transmit power value of 5 W. That is, the UE 215 may indicate to the base station 205-*a* 5 W of available transmit power.

According to aspects, the PHR transmitted in the MAC CE may indicate a transmit power value using one or more bits. Additionally or alternatively, the base station 205-*a* may determine available transmit power level of the UE 215 based on a sign of the transmit power value in the PHR. In the case of multiple bits, the base station 205-*a* or the base station 205-*b* may identify a most significant bit (MSB). The MSB may be a sign bit. For example, the base station 205-*a* and the base station 205-*b* may receive a PHR in a MAC CE. The base station 205-*a* and the base station 205-*b* may identify a MSB. In some cases, the base station 205-*a* and the base station 205-*b* may determine whether the UE 215 has available transmit power based on the sign bit. For instance, if the sign bit is "0" (i.e., zero), this may be a positive indication. That is, the UE 215 may be capable of transmitting at a higher transmit power or may be capable of transmitting at a higher throughput. In this case, the base station 205-*a* or the base station 205-*b* may allocate additional resource blocks to the UE 215. Alternatively, if the sign bit is "1" (i.e., one), this may be a negative indication. That is, the UE 215 may already be transmitting at a maximum transmit power. In this case, the base station 205-*a* or the base station 205-*b* may assume that the UE 215 is using a maximum number of resource blocks and no additional resource blocks need to be assigned.

The UE 215, in some cases, may transmit a PHR to the base station 205-*a* and the base station 205-*b* using a default configured maximum transmit power. The configured maximum transmit power may be based on an overall transmission power value and a static split ratio value. The overall transmission power value may be a maximum transmit power level capability of the UE 215. For example, the UE 215 may have maximum transmit power capability of n Watts (W) (where n is an integer), for UL transmission. The UE 215 may allocate a transmit power for the first link and the second link (associated with split bearer 220-*a* and 220-*b*) equally based on a static split ratio. For instance, in the case that the maximum transmit power is 10 W, the UE 215 may allocate 5 W for the first link and 5 W for the second link.

The UE 215 may transmit a PHR to the base station 205-*a* and the base station 205-*b* indicating a transmit power value (e.g., available transmit power). The base station 205-*a* and the base station 205-*b* may allocate radio resources to the UE 215 based on the PHR, accordingly. The UE 215 may improve allocation of transmit power on the first link or the second link, or both by considering additional characteristics to determine the transmit power for UL transmission on the links between the UE 215 and the base station 205-*a* and the base station 205-*b*.

In some cases, the UE 215 may evaluate a characteristic of each of the first link and the second link. The characteristic may include a type of data scheduled for transmission on a link, transmission duration of data scheduled for transmission on a link, or both. For example, the UE 215 may determine that a higher priority data traffic is scheduled for transmission, on the first link associated with the base station 205-*a*, periodically or during a transmission duration. Additionally, the UE 215 may determine that a lesser priority data traffic is scheduled for transmission on the second link associated with the base station 205-*b*. As such, the UE 215 may allocate additional transmit power for the first link for the scheduled duration of the higher priority data traffic. Alternatively, the UE 215 may determine that the type of data scheduled for transmission on the second link is more resource extensive than the type of data scheduled for transmission on the first link. For example, the UE 215 may be scheduled to transmit resource extensive data, such as broadband type data to the base station 205-*b* as compared to being scheduled to transmit less resource extensive data, such as data utilizing lesser bandwidth than broadband type data, to the base station 205-*a*. In response, the UE 215 may allocate additional transmit power to the second link associated with the base station 205-*b*.

The base station 205-*a* or the base station 205-*b*, or both may determine a transmission schedule associated with the UE 215. In some cases, the base station 205-*a* and the base station 205-*b* may track data traffic associated with the UE 215, and determine a transmission schedule associated with the tracked data traffic. For example, the base station 205-*a* and the base station 205-*b* may determine type of data traffic transmitted from the UE 215 periodically or during a transmission duration (e.g., time of day, week). As such, in some examples, the base station 205-*a* and the base station 205-*b* may adjust an UL grant based on the determined transmission schedule of the UE 215, and transmit the UL grant to the UE 215 for configuring a transmit power level. Additionally or alternatively, the base station 205-*a* and the base station 205-*b* may store and track PHR received from the UE 215 and determine a transmit power level pattern based on the tracked PHR.

Adjusting an allocation of transmit power on a link may include the UE 215 transmitting an adjusted PHR to the base station 205-*a* or the base station 205-*b*, or both. The UE 215 may adjust a transmit power value transmitted in the initial PHR associated with the first link or the second link, or both based on the adjustment of the transmit power. In the case above, where the first link has higher priority data traffic scheduled compared to the second link, the UE 215 may indicate a change in the transmission power remaining accessible by the UE 215. For example, the UE 215 may initially have allocated 10 W for UL transmission on the first link and 10 W for the second link. Since, the UE 215 has higher priority data traffic scheduled on the first link, the UE 215 may adjust the transmit power for UL transmission on the first link to 15 W. The UE 215 may indicate this transmit power value in an adjusted PHR. The UE 215 may transmit the adjusted PHR to base station 205-*a*. As a result, base station 205-*a* may allocate additional radio resources (e.g., radio blocks, bandwidth) to the UE 215 for the first link. For instance, the base station 205-*a* may transmit an UL grant including radio resources to the UE 215. The UL grant may indicate an increase in allocation of radio resources associated with the first link In some examples, the base station 205-*a* or the base station 205-*b* may determine an allocation (e.g., a power allocation, a percentage allocation such as a percentage of UL transmit power, etc.) of UL transmit power between the base station 205-*a* and the base station 205-*b* for the UE 215. The UL transmit power may in some cases be a maximum UL transmit power. The base station 205-*a* or the base station 205-*b* may transmit an indication of the allocation of UL transmit power between the base station 205-*a* or the base station 205-*b* to the UE 215. The indication of the allocation of UL transmit power may in some cases include an indication of a maximum UL transmit power, or a percentage of maximum UL transmit power, allocated to each of base station 205-*a* or base station 205-*b*.

In some examples, such as when the base station 205-*a* or base station 205-*b* are scheduled to receive data traffic from the UE 215, the allocation of UL transmit power of the base station 205-*a* or the base station 205-*b* may be adjusted accordingly. For example, based on the characteristic of the data traffic, the UL transmit power may change over time. In some cases, the UL transmit power may be adjusted based on the characteristic of the data traffic satisfying a threshold value. For example, when data traffic load of base station 205-*a* is less (below the threshold value) during a particular time period, more of the UL transmit power available to the UE 215 during the time period may be allocated to the base station 205-*b* with which the UE 215 is communicating (e.g., transmitting data traffic) during the time period. Conversely, more of the total UL transmit power available to the UE 215 during the time period may be allocated to the base station 205-*a* when the data traffic load of the base station 205-*a* is greater (e.g., above the threshold value) during a particular time period.

In some examples, allocation of UL transmit power for the base station 205-*a* or the base station 205-*b* may be indicated in subframes on which UL transmit power may be allocated to the base station 205-*a* or the base station 205-*b*. For example, during a subframe or time period in which no UL communications to a base station (e.g., the base station 205-*b*) is expected, all UL transmit power may be allocated to another base station (e.g., the base station 205-*a*).

Additionally or alternatively, the UE 215 may adjust the transmit power for UL transmission on the second link in response to adjusting the transmit power on the first link. In some examples, base station 205-*a* may transmit a change in the UE's 215 PHR to base station 205-*b* via wireless link 210. The adjustment of the transmit power on the second link may also be indicated in the adjusted PHR, that the UE 215 may transmit the adjusted PHR to the base station 205-*b*. The base station 205-*b* may also transmit an UL grant including radio resources to the UE 215. The UL grant may indicate a decrease in allocation of radio resources associated with the second link. As such, the UE 215 may configure a maximum transmit power on associated links of connected base stations 205, and report PHRs that are semi-static and time-variant based on evaluating the additional characteristics (e.g., data traffic type, data rate, data patterns, scheduled transmission).

Figure 3:
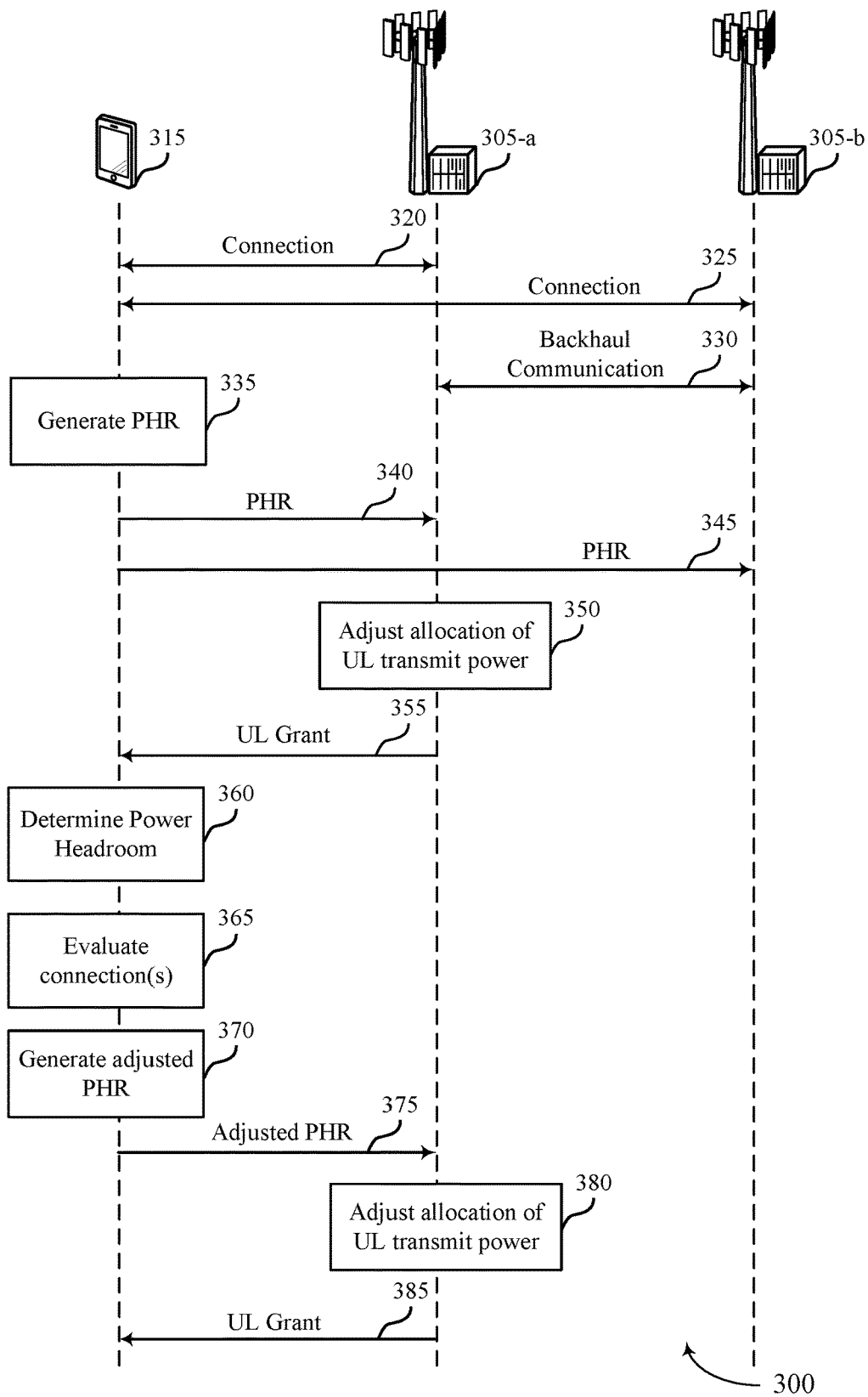
FIG. 3 illustrates an example of a process flow that supports PHR for UL split bearer communications, in accordance with one or more aspects of the present disclosure.

FIG. 3 illustrates an example of a process flow 300 that supports PHR for UL split bearer communications, in accordance with one or more aspects of the present disclosure. In some examples, process flow 300 may implement aspects of systems 100 and 200. Each of UE 315, base station 305-*a*, or base station 305-*b* may be an example of aspects of a respective one of the UEs 115 or base stations 105 described with reference to FIG. 1 or 2. In some cases, the base station 305-*a* may include a master gNB and the base station 305-*b* may include a secondary gNB.

In the following description of the process flow 300, the operations between the UE 315, the base station 305-*a*, or base station 305-*b* may be transmitted in a different order than the exemplary order shown, or the operations performed by UE 315, the base station 305-*a*, or base station 305-*b* may be performed in different orders or at different times. Certain operations may also be left out of the process flow 300, or other operations may be added to the process flow 300.

The process flow 300 may commence with the UE 315 establishing a connection 320 with the base station 305-*a* and a connection 325 with base station 305-*b*. Each of base station 305-*a* and base station 305-*b* may provide radio resources to the UE 315 for respective UL communications. Additionally or alternatively, each of the base station 305-*a* and the base station 305-*b* may also provide radio resources to the UE 315 for respective DL communications. In some examples, when transmitting UL communications to the base station 305-*a* and the base station 305-*b*, UE 315 may transmit UL communications based on an indication of an allocation of UL transmit power between the base station 305-*a* and the base station 305-*b* for the UE 315. The indication may be provided to the UE 315 by the base station 305-*a*.

The base station 305-*a* may be, additionally or alternatively, used to coordinate multi-connectivity communication for the UE 315 with the base station 305-*a* and the base station 305-*b*. To assist the base station 305-*a* in coordinating multi-connectivity communication for the UE 315, the base station 305-*a* may transmit or receive backhaul communications 330 with the base station 305-*b*. In some cases, the base station 305-*a* and the base station 305-*b* may communicate with the UE 315 using different carriers, and thus, the backhaul communications 330 may be transmitted or received by means of a non-ideal backhaul link (e.g., a backhaul link implementing an X2 interface).

At 335, UE 315 may generate a PHR for a base station (e.g., the base station 305-*a* or the base station 305-*b*, or both). Generation of a PHR may be triggered for a base station (e.g., the base station 305-*a* or the base station 305-*b*, or both) based on a condition of a transmit power value. By way of example, the condition may be a determination that an UL transmit power of UE 315 for the base station 305-*a* or the base station 305-*b* has crossed a threshold. In some cases, the threshold may include a maximum UL power for the base station 305-*a*, the base station 305-*b*, or the UE 315. By way of further example, the condition of may be associated with the base station 305-*a* or the base station 305-*d*, e.g., a measured path loss (e.g., a path loss variation satisfying a threshold) of the base station 305-*a* or the base station 305-*b*, or both.

A PHR may include power headroom information for one or both the base station 305-*a* or the base station 305-*b*. The inclusion of power headroom information for both the base station 305-*a* or the base station 305-*b* may reduce power headroom report overhead and enable the base station 305-*a* or the base station 305-*b* to estimate a total UL transmit power used by the UE 315. In some examples, the power headroom information may be computed per cell as:

PH(cell)=MaxPower(cell)−ActualTxPower(cell), where PH(cell) is the power headroom of a cell, MaxPower(cell) is the maximum UL transmit power of the cell, and ActualTxPower(cell) is the current actual UL transmit power of the cell.

In some cases, a PHR may be automatically transmitted to a base station. A PHR may be transmitted to the base station 305-*a* or the base station 305-*b*, as indicated by the transmission of PHR 340 and PHR 345. Additionally or alternatively, the UE 315 may transmit the PHR to base station 305-*a*. In this case, the base station 305-*a* may receive the PHR 340 and transmit a copy of the PHR 340 to the base station 305-*b*.

At 350, the base station 305-*a* may adjust an allocation of UL transmit power for UE 315. The allocation may be adjusted based on the PHR 340. In some cases, base station 305-*b* may not need to adjust an allocation of UL transmit power based on the PHR 345. The base station 305-*a* may transmit an UL grant 355 to the UE 315 based on the adjusted allocation UL transmit power. At 360, the UE 315 may determine a power headroom for the base station 305-*a* with respect to the UL transmit power allocated to the base station 305-*a*.

At 365, the UE 315 may evaluate a characteristic of the connection 320 or the connection 325, or both. For example, the UE 315 may identify a type of data scheduled for transmission, identify a transmission duration of data scheduled for transmission, identify a priority of data scheduled for transmission, or identify a combination thereof. The UE 315 may configure an available transmit power value associated with the connection 320 or the connection 325, or both based on evaluating the characteristic of the connection 320 or the connection 325, or both.

At 370, the UE 315 may generate an adjusted PHR based on evaluating the characteristic of the connection 320 or the connection 325, or both. In some examples, the UE 315 may generate the adjusted PHR based on an available transmit power value and a transmit power value condition associated with scheduled data traffic for an upcoming UL transmission. The UE 315 may transmit the adjusted PHR 375 to the base station 305-*a* or the base station 305-*b* (not shown).

At 380, the base station 305-*a* may adjust an allocation of UL transmit power for the UE 315 based on the adjusted PHR. The base station 305-*a* may transmit an UL grant 385 to the UE 315 based on the adjusted allocation of UL transmit power.

Thus, the UE 315 may dynamically configure the maximum transmit power on one or more links based on characteristics associated with the one or more links. In some examples, the UE 315 may be configured to determine the maximum transmit power based on the traffic type and traffic patterns associated with the one or more links. In some cases, the UE 315 may then report corresponding PHRs associated with the one or more links in a semi-static and time-variant manner.

Figure 4:
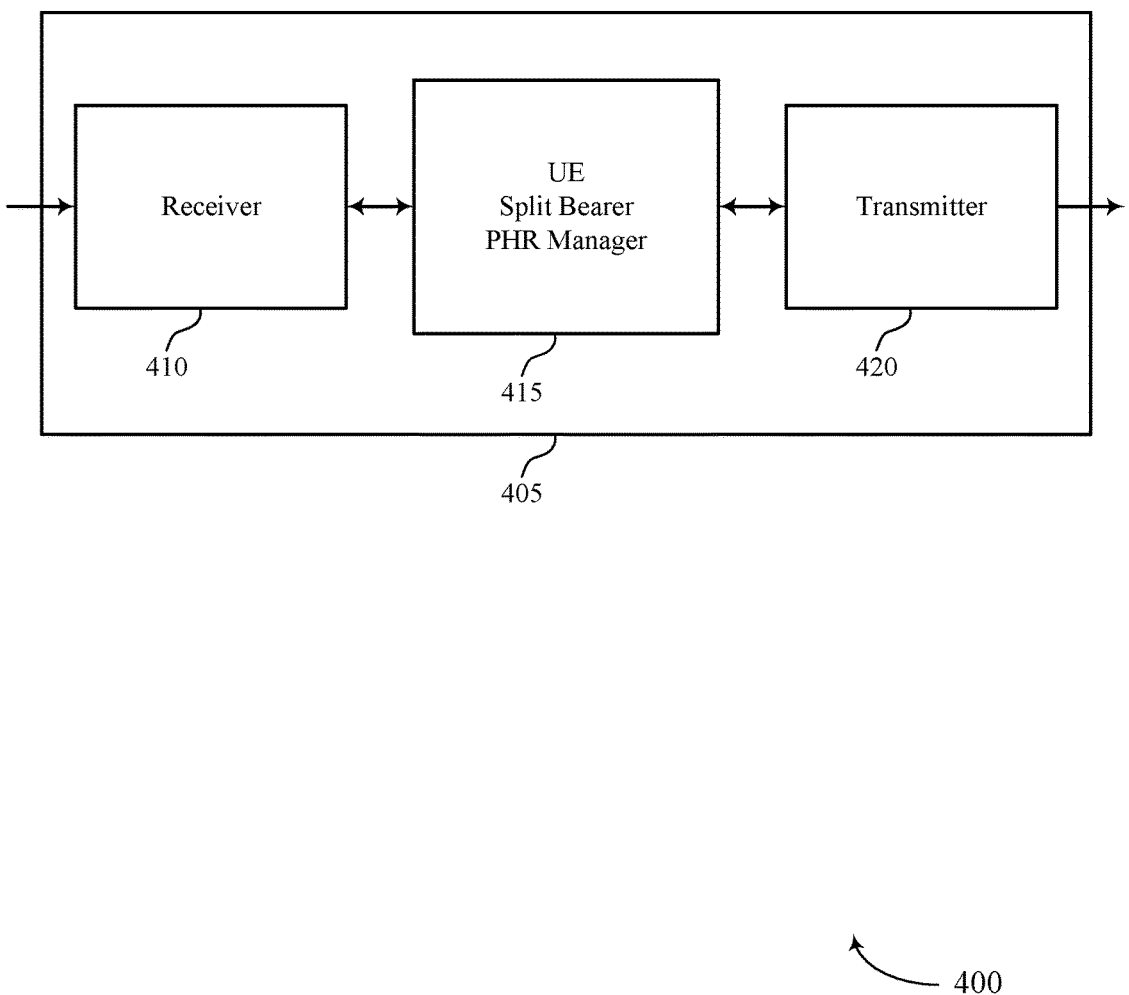
FIGS. 4 through 6 show block diagrams of a device that supports PHR for UL split bearer communications, in accordance with one or more aspects of the present disclosure.

FIG. 4 shows a block diagram 400 of a wireless device 405 that supports PHR for UL split bearer communications, in accordance with one or more aspects of the present disclosure. Wireless device 405 may be an example of aspects of a UE 115 as described herein. Wireless device 405 may include receiver 410, UE split bearer PHR manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to PHR for UL split bearer communications, etc.). Information may be passed on to other components of the device. The receiver 410 may be an example of aspects of the transceiver 735 described with reference to FIG. 7. The receiver 410 may utilize a single antenna or a set of antennas.

Receiver 410 may adjust a transmit power level associated with a first link or a second link, or both for a scheduled data traffic based on configuring and receiving from a first base station or a second base station, or both an UL grant including radio resources based on an adjusted PHR. In some cases, the received UL grant indicates a decrease in allocation of radio resources associated with the first link or the second link, or both based on the adjusted PHR. In some cases, the received UL grant indicates an increase in allocation of radio resources associated with the first link or the second link, or both based on the adjusted PHR.

UE split bearer PHR manager 415 may be an example of aspects of the UE split bearer PHR manager 715 described with reference to FIG. 7. UE split bearer PHR manager 415 and/or at least some of its various sub-components may be implemented in hardware, software executed by a processor, firmware, or any combination thereof. If implemented in software executed by a processor, the functions of the UE split bearer PHR manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE split bearer PHR manager 415 and/or at least some of its various sub-components may be physically located at various positions, including being distributed such that portions of functions are implemented at different physical locations by one or more physical devices. In some examples, UE split bearer PHR manager 415 and/or at least some of its various sub-components may be a separate and distinct component in accordance with various aspects of the present disclosure. In other examples, UE split bearer PHR manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE split bearer PHR manager 415 may evaluate a characteristic associated with the first link or the second link after transmitting the first PHR and adjust a transmit power value transmitted in the first PHR associated with the first link or the second link, or both based on the evaluating.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas. Transmitter 420 may transmit the first PHR to a first base station on the first link of a split bearer and to a second base station on the second link of the split bearer and transmit an adjusted PHR to the first base station or the second base station, or both based on the evaluating.

Figure 5:
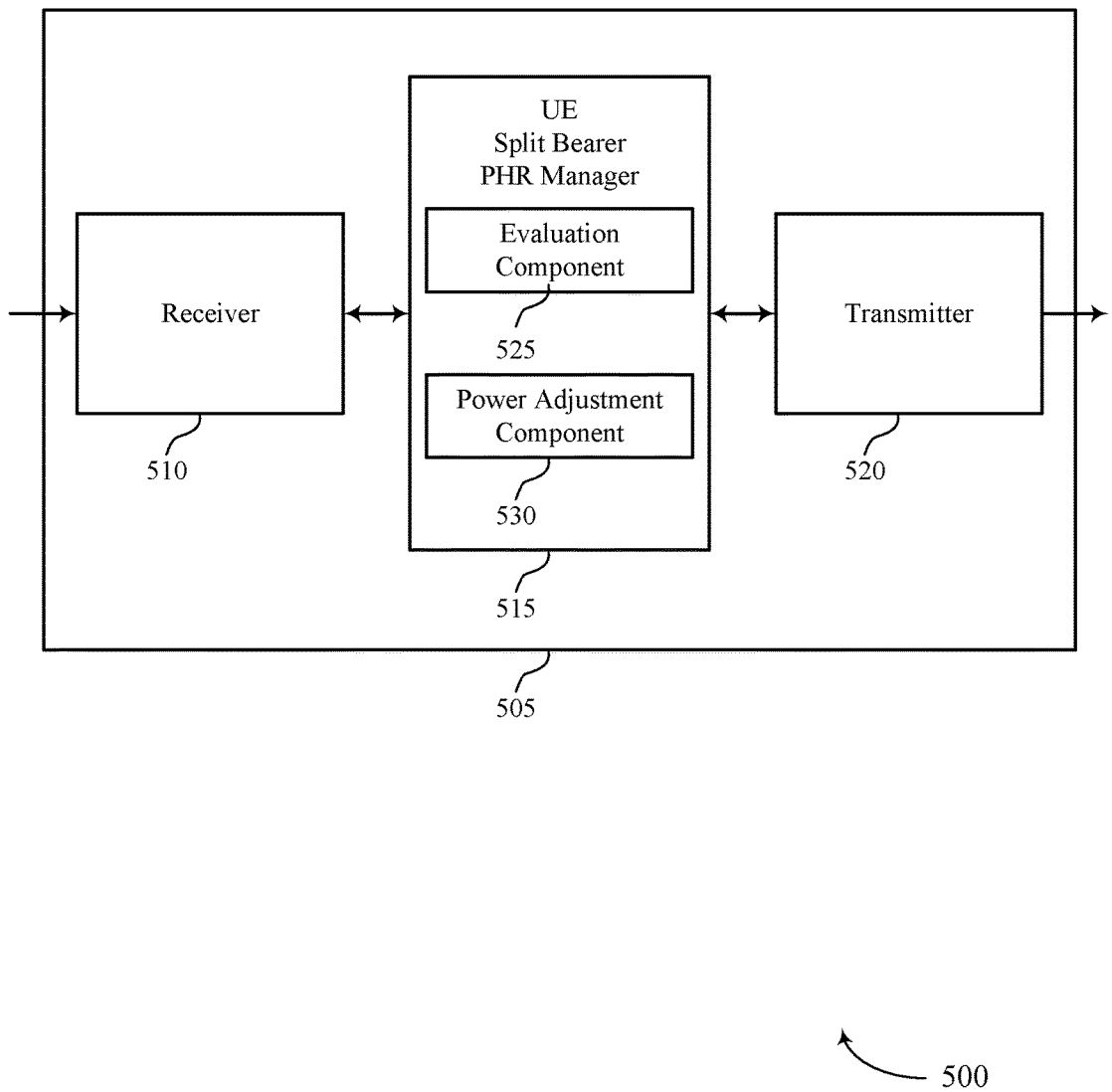

FIG. 5 shows a block diagram 500 of a wireless device 505 that supports PHR for UL split bearer communications, in accordance with one or more aspects of the present disclosure. Wireless device 505 may be an example of aspects of a wireless device 405 or a UE 115 as described with reference to FIG. 4. Wireless device 505 may include receiver 510, UE split bearer PHR manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to PHR for UL split bearer communications, etc.). Information may be passed on to other components of the device. The receiver 510 may be an example of aspects of the transceiver 735 described with reference to FIG. 7. The receiver 510 may utilize a single antenna or a set of antennas.

UE split bearer PHR manager 515 may be an example of aspects of the UE split bearer PHR manager 715 described with reference to FIG. 7. UE split bearer PHR manager 515 may also include evaluation component 525 and power adjustment component 530.

Evaluation component 525 may evaluate a characteristic associated with a first link or a second link after transmitting a first PHR. Power adjustment component 530 may adjust a transmit power value transmitted in the first PHR associated with the first link or the second link, or both based on the evaluating and configure an available transmit power value associated with the first link or the second link, or both based on the identifying.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
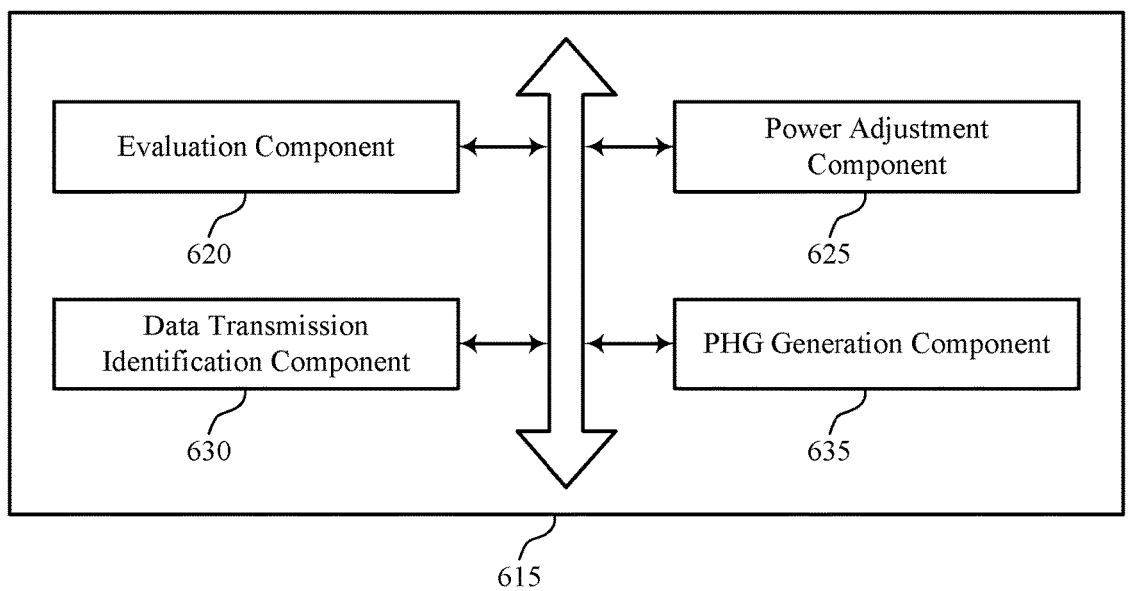

FIG. 6 shows a block diagram 600 of a UE split bearer PHR manager 615 that supports PHR for UL split bearer communications, in accordance with one or more aspects of the present disclosure. The UE split bearer PHR manager 615 may be an example of aspects of a UE split bearer PHR manager 415, a UE split bearer PHR manager 515, or a UE split bearer PHR manager 715 described with reference to FIGS. 4, 5, and 7. The UE split bearer PHR manager 615 may include evaluation component 620, power adjustment component 625, data transmission identification component 630, and PHR generation component 635. Each of these modules may communicate, directly or indirectly, with one another (e.g., via one or more buses).

Evaluation component 620 may evaluate a characteristic associated with the first link or the second link after transmitting the first PHR. Power adjustment component 625 may adjust a transmit power value transmitted in the first PHR associated with the first link or the second link, or both based on evaluating and configure an available transmit power value associated with the first link or the second link, or both based on the identifying.

Data transmission identification component 630 may identify a type of data scheduled for transmission, identify a transmission duration of data scheduled for transmission, identify a priority of data scheduled for transmission, or identify a combination thereof. PHR generation component 635 may generate the adjusted PHR based on the available transmit power value and a transmit power value condition associated with scheduled data traffic for an upcoming UL transmission. In some examples, transmitting the adjusted PHR is based on the generating.

Figure 7:
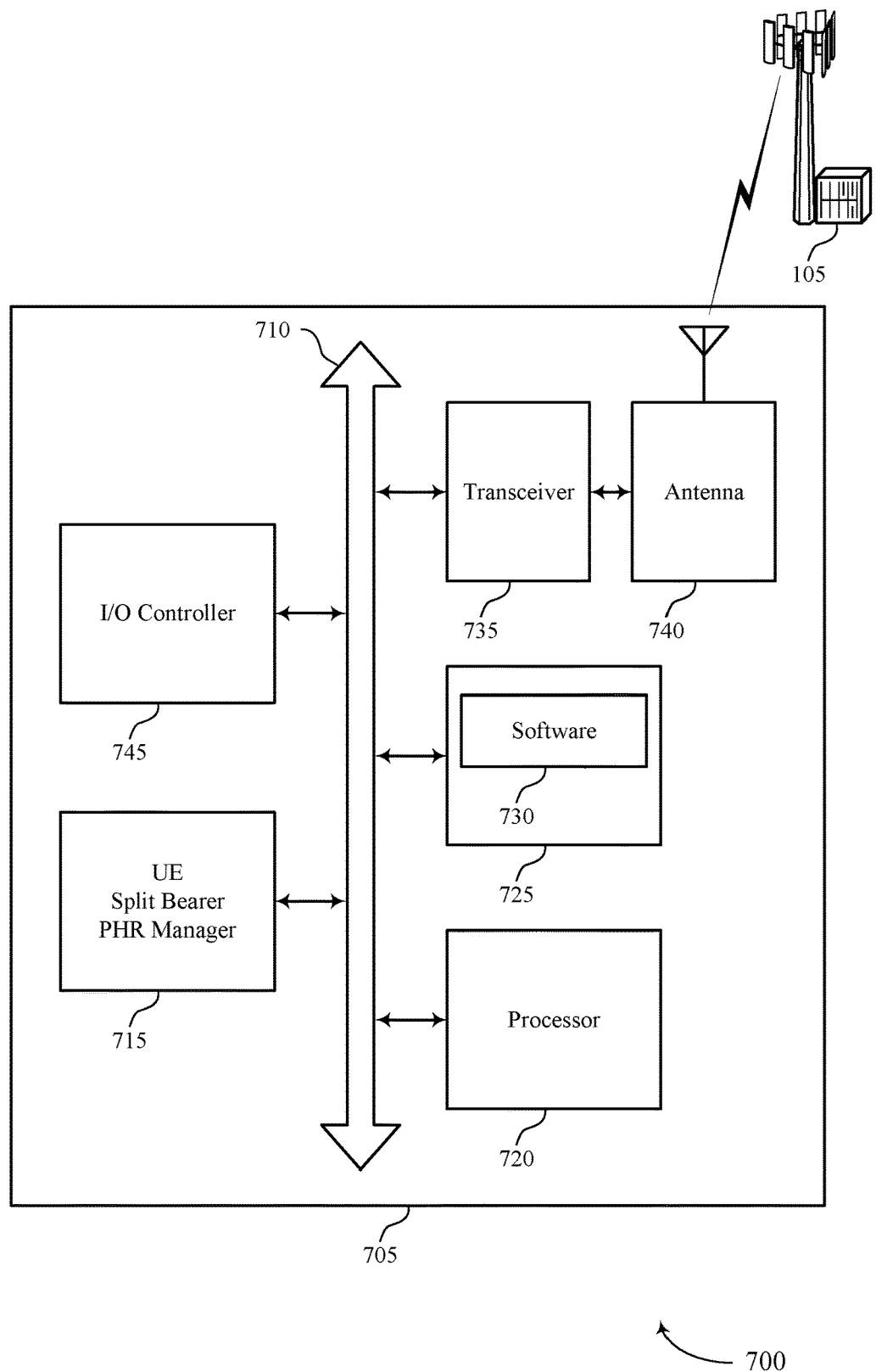
FIG. 7 illustrates a block diagram of a system including a UE that supports PHR for UL split bearer communications, in accordance with one or more aspects of the present disclosure.

FIG. 7 shows a diagram of a system 700 including a device 705 that supports PHR for UL split bearer communications, in accordance with one or more aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE split bearer PHR manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting PHR for UL split bearer communications).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices. Software 730 may include code to implement aspects of the present disclosure, including code to support PHR for UL split bearer communications. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Functionalities of the wireless device 705 may be improved by allowing the wireless device 705 to dynamically configure maximum transmit power on one or more links based on characteristics associated with the one or more links. By having the wireless device 705 determine the maximum transmit power based on the traffic type and traffic patterns associated with the one or more links, for example, improved functionalities of the wireless device 705 may be recognized for configuring PHRs reporting in a semi-static and time-variant manner.

Figure 8:
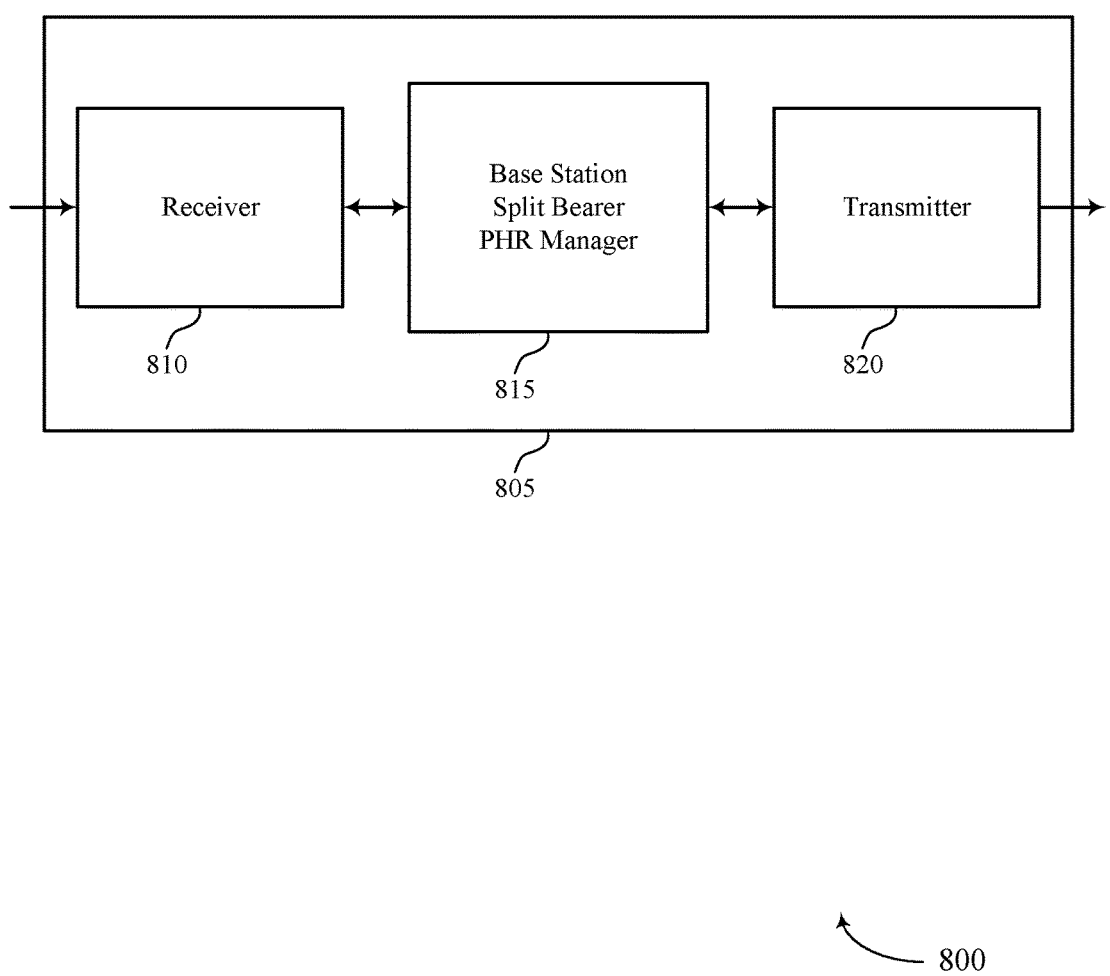
FIGS. 8 through 9 show block diagrams of a device that supports PHR for UL split bearer communications, in accordance with one or more aspects of the present disclosure.

FIG. 8 shows a block diagram 800 of a wireless device 805 that supports PHR for UL split bearer communications, in accordance with one or more aspects of the present disclosure. Wireless device 805 may be an example of aspects of a base station 105 as described herein. Wireless device 805 may include receiver 810, base station split bearer PHR manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to PHR for UL split bearer communications, etc.). Information may be passed on to other components of the device. The receiver 810 may be an example of aspects of the transceiver 1035 described with reference to FIG. 10. The receiver 810 may utilize a single antenna or a set of antennas.

Base station split bearer PHR manager 815 may be an example of aspects of the base station split bearer PHR manager 1015 described with reference to FIG. 10. Base station split bearer PHR manager 815 and/or at least some of its various sub-components may be implemented in hardware, software executed by a processor, firmware, or any combination thereof. If implemented in software executed by a processor, the functions of the base station split bearer PHR manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station split bearer PHR manager 815 and/or at least some of its various sub-components may be physically located at various positions, including being distributed such that portions of functions are implemented at different physical locations by one or more physical devices. In some examples, base station split bearer PHR manager 815 and/or at least some of its various sub-components may be a separate and distinct component in accordance with various aspects of the present disclosure. In other examples, base station split bearer PHR manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station split bearer PHR manager 815 may receive a first PHR from a UE at a first time, and transmit an UL grant including radio resources based on the first PHR. In some cases, base station split bearer PHR manager 815 may receive an adjusted PHR from the UE at a second time different from the first time, and transmit an adjusted UL grant including radio resources based on the adjusted PHR.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
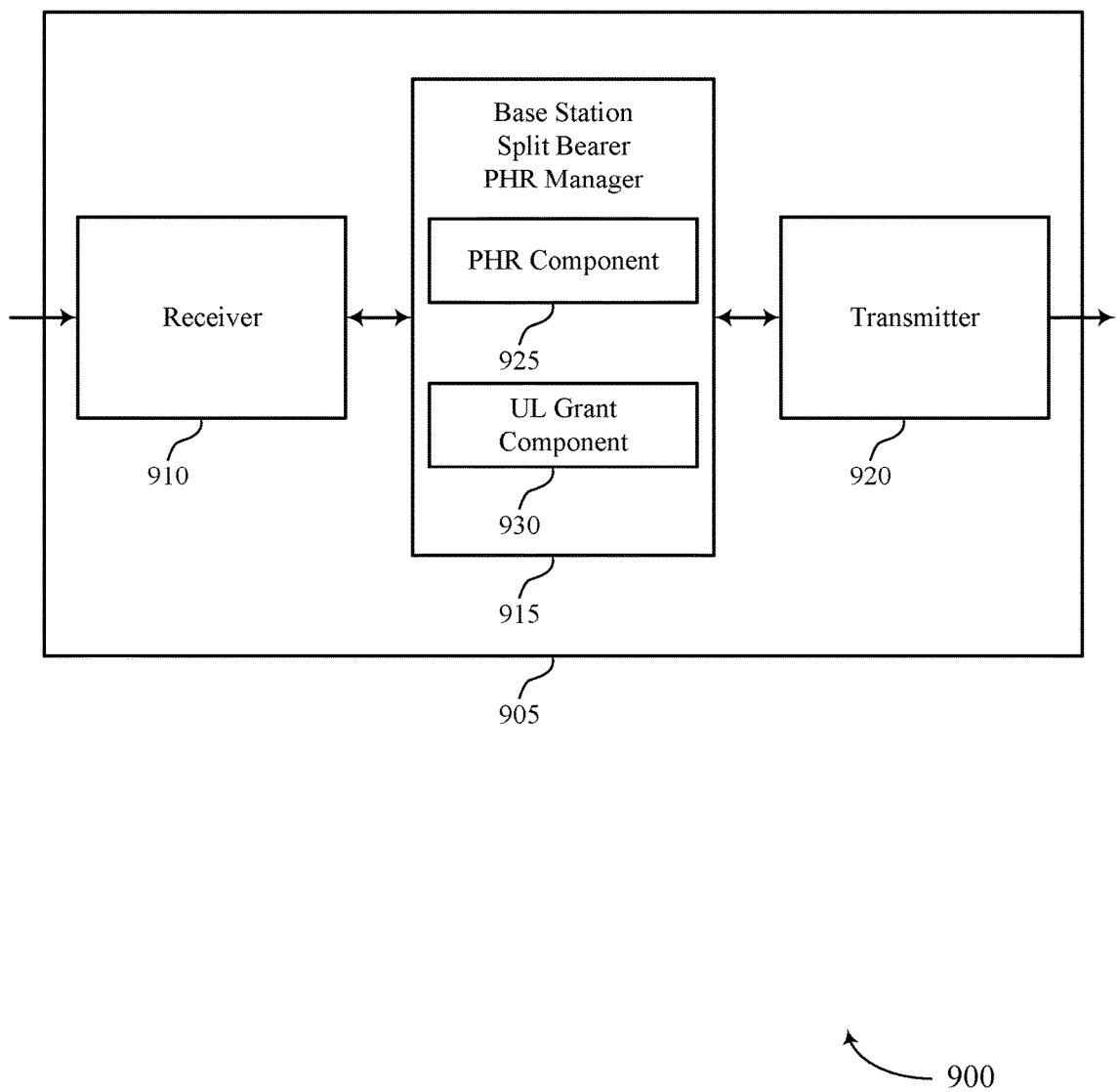

FIG. 9 shows a block diagram 900 of a wireless device 905 that supports PHR for UL split bearer communications, in accordance with one or more aspects of the present disclosure. Wireless device 905 may be an example of aspects of a wireless device 805 or a base station 105 as described with reference to FIG. 8. Wireless device 905 may include receiver 910, base station split bearer PHR manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to PHR for UL split bearer communications, etc.). Information may be passed on to other components of the device. The receiver 910 may be an example of aspects of the transceiver 1035 described with reference to FIG. 10. The receiver 910 may utilize a single antenna or a set of antennas.

Base station split bearer PHR manager 915 may be an example of aspects of the base station split bearer PHR manager 1015 described with reference to FIG. 10. Base station split bearer PHR manager 915 may also include PHR component 925 and UL grant component 930. PHR component 925 may receive a first PHR from a UE at a first time and receive an adjusted PHR from the UE at a second time different from the first time. UL grant component 930 may transmit an UL grant including radio resources based on the first PHR and transmit an adjusted UL grant including radio resources based on the adjusted PHR. In some cases, the adjusted UL grant indicates a decrease in allocation of radio resources associated with a link between the base station and the UE based on the adjusted PHR. In some cases, the adjusted UL grant indicates a decrease in allocation of radio resources associated with a link between the base station and the UE based on the adjusted PHR.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
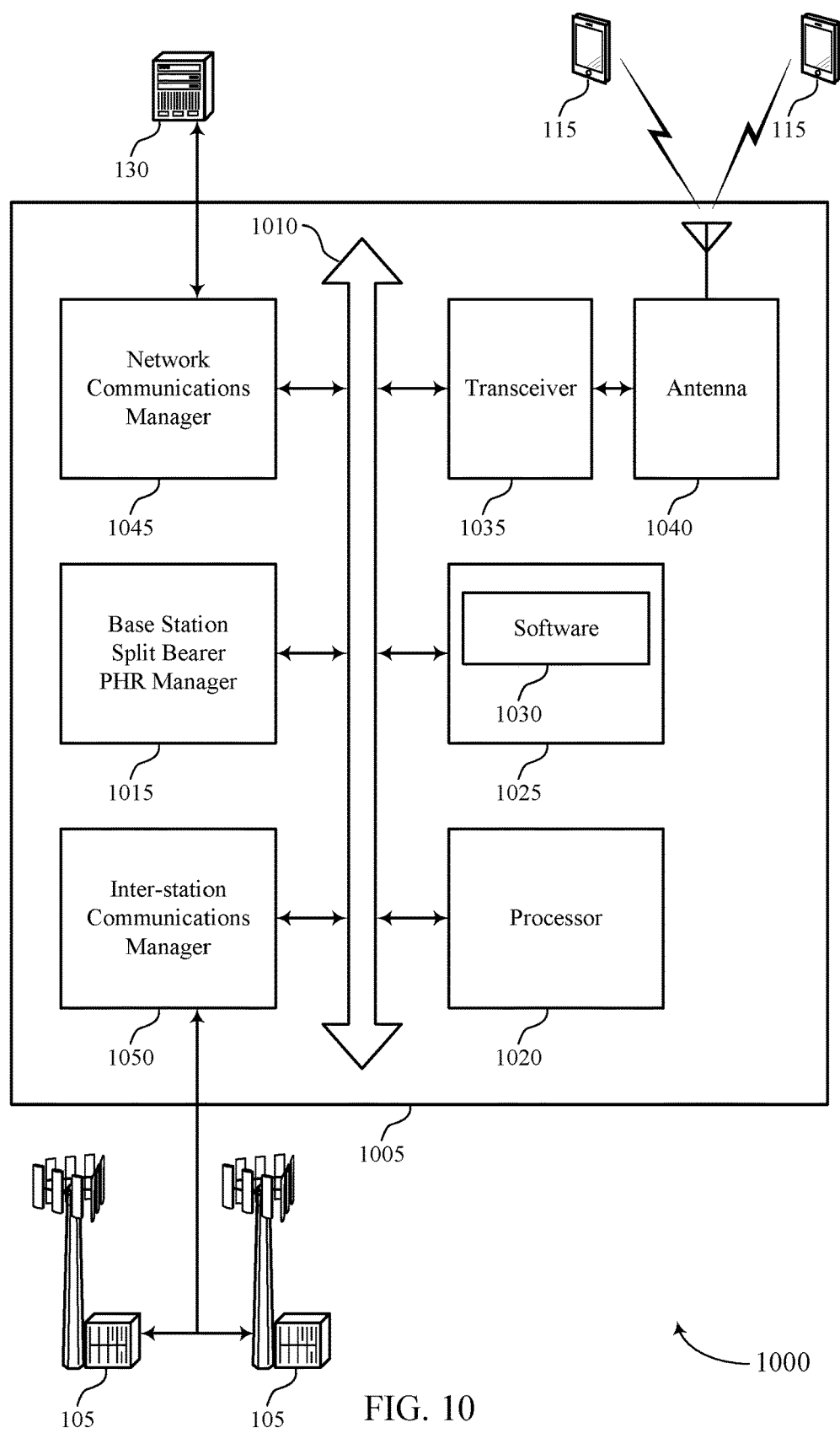
FIG. 10 illustrates a block diagram of a system including a base station that supports PHR for UL split bearer communications, in accordance with one or more aspects of the present disclosure.

FIG. 10 shows a diagram of a system 1000 including a device 1005 that supports PHR for UL split bearer communications, in accordance with one or more aspects of the present disclosure. Device 1005 may be an example of or include the components of base station 105 as described above, e.g., with reference to FIG. 1. Device 1005 may include components for bi-directional voice and data communications including components for transmitting and receiving communications, including base station split bearer PHR manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting PHR for UL split bearer communications).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices. Software 1030 may include code to implement aspects of the present disclosure, including code to support PHR for UL split bearer communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115. Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

In some examples, the wireless device 1005 (such as base station 105) may be configured to communicate with a UE. As part of the communication procedure, the wireless device 1005 may transmit an UL grant including radio resources upon receiving a first PHR from a UE (such as UE 115). The wireless device 1005 may receive an adjusted PHR from the UE. The adjusted PHR may be based on a characteristic associated with a link between the wireless device 1005 and the UE. For example, the UE may transmit a higher priority traffic over the link between the wireless device 1005 and the UE. In such cases, it may be advantageous for the UE to allocate more transmit power to the link bearing the higher priority traffic. The UE may dynamically configure a maximum transmit power on one or more links based on characteristics associated with the one or more links. As such, the wireless device 1005 may be configured to transmit an adjusted UL grant including radio resources based on the adjusted PHR. This results in improved functionalities of the wireless device 1005 which may conserve radio resources by transmitting UL grants based on a dynamically configured maximum transmit power of a link.

Figure 11:
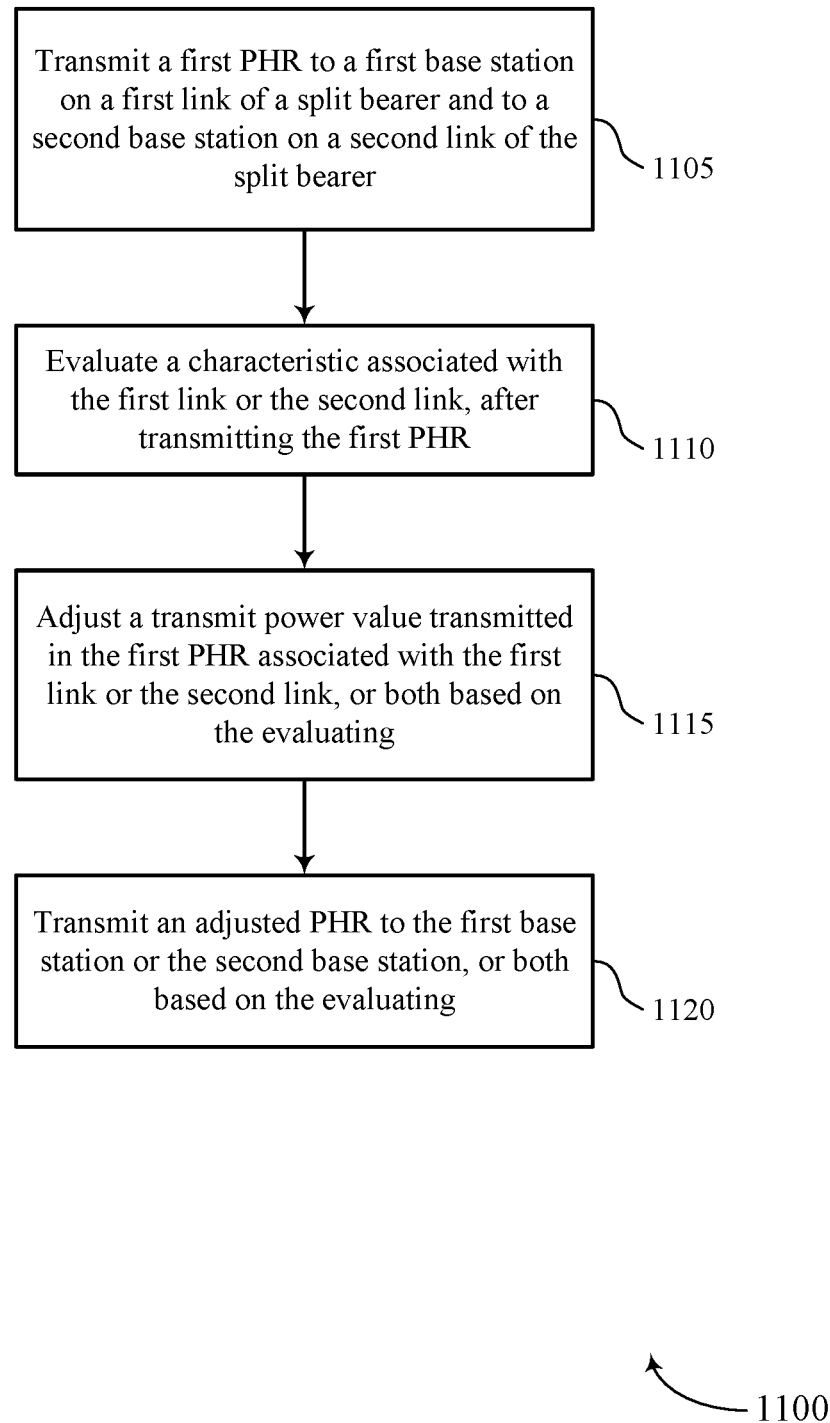
FIGS. 11 through 14 illustrate methods for PHR for UL split bearer communications, in accordance with one or more aspects of the present disclosure.

FIG. 11 shows a flowchart illustrating a method 1100 for PHR for UL split bearer communications, in accordance with one or more aspects of the present disclosure. The operations of method 1100 may be implemented by a UE 115 or its components as described herein. For example, the operations of method 1100 may be performed by a UE split bearer PHR manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1105 the UE 115 may transmit a first PHR to a first base station on a first link of a split bearer and to a second base station on a second link of the split bearer. In some examples, the first PHR may be transmitted on a subframe of a frame. For example, the first PHR may be a type of MAC CE that reports available transmit power. The operations at 1105 may be performed according to the methods described herein. In certain examples, aspects of the operations at 1105 may be performed by a transmitter as described with reference to FIGS. 4 through 7.

At 1110 the UE 115 may evaluate a characteristic associated with the first link or the second link, after transmitting the first PHR. UE 115 may, for example, identify a type of data scheduled for transmission. Additionally or alternatively, UE 115 may identify a transmission duration of data scheduled for transmission. In some cases, UE 115 may identify also a priority of data scheduled for transmission. The operations at 1110 may be performed according to the methods described herein. In certain examples, aspects of the operations at 1110 may be performed by an evaluation component as described with reference to FIGS. 4 through 7.

At 1115 the UE 115 may adjust a transmit power value transmitted in the first PHR associated with the first link or the second link, or both based on the evaluating. For example, UE 115 may have an assigned transmit power value of 20 W for the first base station and have a second assigned transmit power value of 20 W for the second base station. Based on evaluating the characteristic associated with the first link or the second link, UE 115 may identify that it has higher priority data scheduled for transmission on the first link based at least in part on the type of data traffic (e.g., broadband data) associated with the data. As a result, UE 115 may adjust the assigned transmit power value for the first base station from 20 W to 30 W. Similarly, UE 115 may adjust the assigned transmit power value for the second base station from 20 W to 10 W. The operations at 1115 may be performed according to the methods described herein. In certain examples, aspects of the operations at 1115 may be performed by a power adjustment component as described with reference to FIGS. 4 through 7.

At 1120 the UE 115 may transmit an adjusted PHR to the first base station or the second base station, or both based on the evaluating. The operations at 1120 may be performed according to the methods described herein. In certain examples, aspects of the operations at 1120 may be performed by a transmitter as described with reference to FIGS. 4 through 7.

Figure 12:
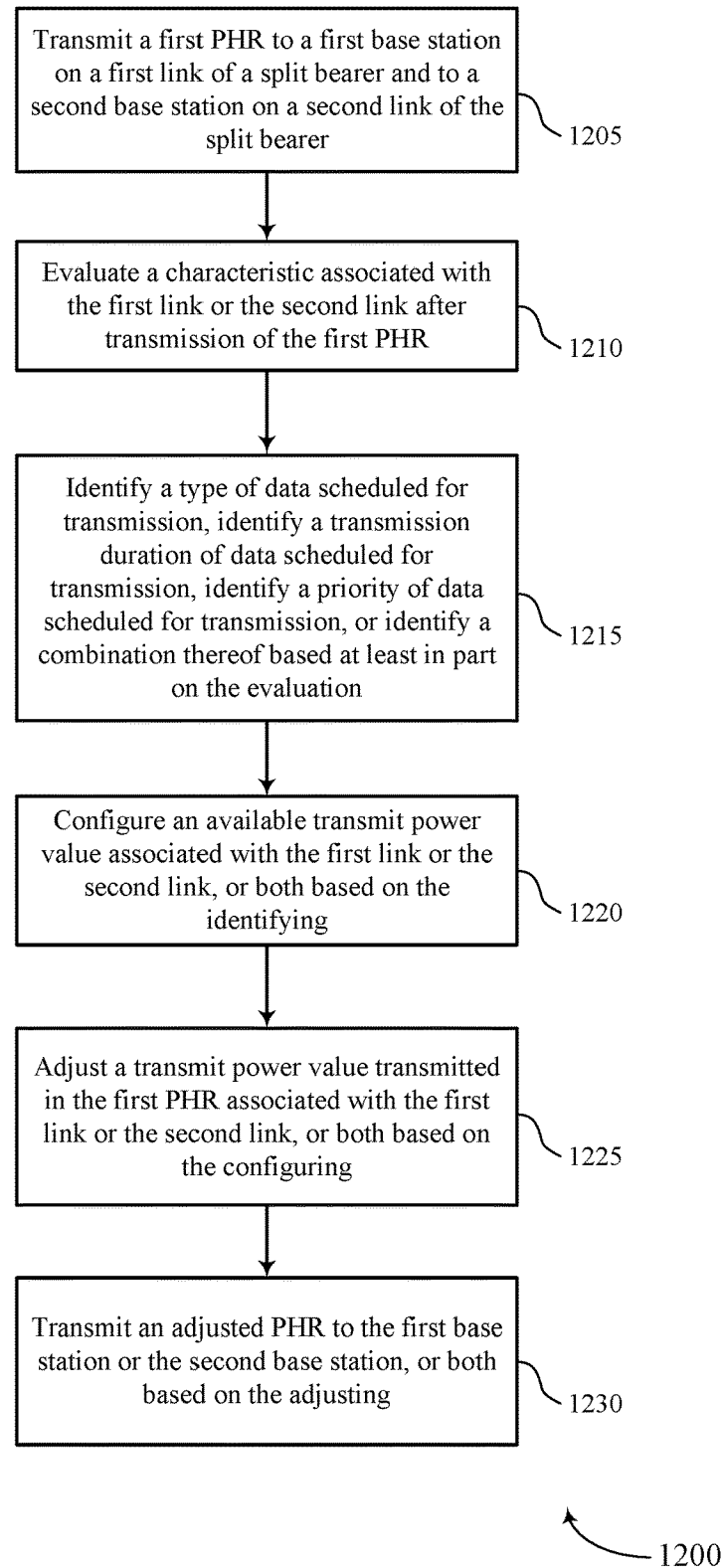

FIG. 12 shows a flowchart illustrating a method 1200 for PHR for UL split bearer communications, in accordance with one or more aspects of the present disclosure. The operations of method 1200 may be implemented by a UE 115 or its components as described herein. For example, the operations of method 1200 may be performed by a UE split bearer PHR manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may transmit a first PHR to a first base station on a first link of a split bearer and to a second base station on a second link of the split bearer. The operations at 1205 may be performed according to the methods described herein. In certain examples, aspects of the operations at 1205 may be performed by a transmitter as described with reference to FIGS. 4 through 7.

At 1210 the UE 115 may evaluate a characteristic associated with the first link or the second link, after transmission of the first PHR. The operations at 1210 may be performed according to the methods described herein. In certain examples, aspects of the operations at 1210 may be performed by an evaluation component as described with reference to FIGS. 4 through 7.

At 1215 the UE 115 may identify a type of data scheduled for transmission, identify a transmission duration of data scheduled for transmission, identify a priority of data scheduled for transmission, or identify a combination thereof based on the evaluation. The operations at 1215 may be performed according to the methods described herein. In certain examples, aspects of the operations at 1215 may be performed by a data transmission identification component as described with reference to FIGS. 4 through 7.

At 1220 the UE 115 may configure an available transmit power value associated with the first link or the second link, or both based on the identifying. The operations at 1220 may be performed according to the methods described herein. In certain examples, aspects of the operations at 1220 may be performed by a power adjustment component as described with reference to FIGS. 4 through 7

At 1225 the UE 115 may adjust a transmit power value transmitted in the first PHR associated with the first link or the second link, or both based on the configuring. The operations at 1225 may be performed according to the methods described herein. In certain examples, aspects of the operations at 1225 may be performed by a power adjustment component as described with reference to FIGS. 4 through 7.

At 1230 the UE 115 may transmit an adjusted PHR to the first base station or the second base station, or both based on the adjusting. The operations at 1230 may be performed according to the methods described herein. In certain examples, aspects of the operations at 1230 may be performed by a transmitter as described with reference to FIGS. 4 through 7.

Figure 13:
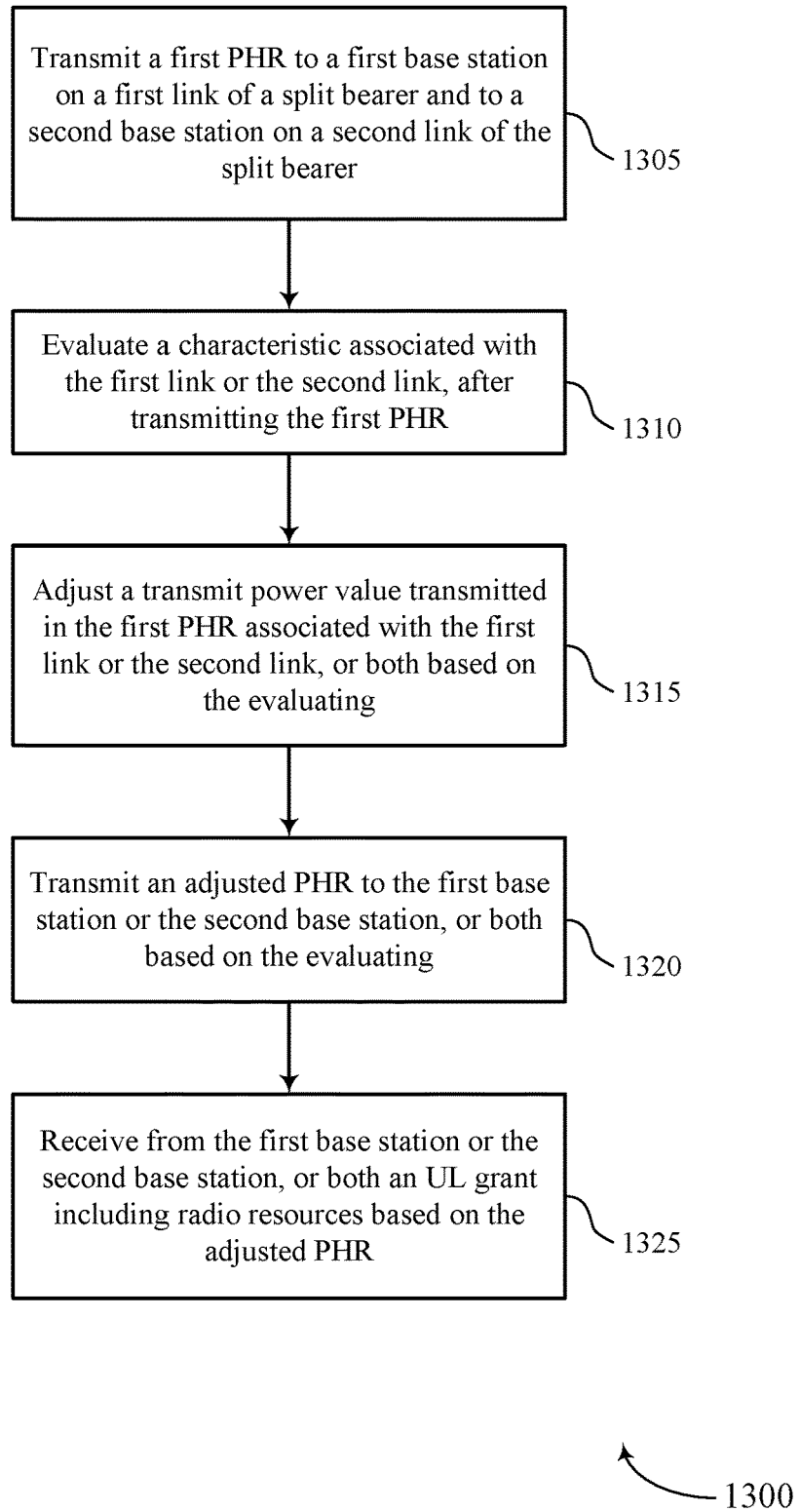

FIG. 13 shows a flowchart illustrating a method 1300 for PHR for UL split bearer communications, in accordance with one or more aspects of the present disclosure. The operations of method 1300 may be implemented by a UE 115 or its components as described herein. For example, the operations of method 1300 may be performed by a UE split bearer PHR manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may transmit a first PHR to a first base station on a first link of a split bearer and to a second base station on a second link of the split bearer. In some examples, the first PHR may be transmitted on a subframe of a frame. For example, the first PHR may be a type of MAC CE that reports available transmit power. That is, the first PHR may indicate how much transmission power remains for UE 115 to use in addition to transmit power being used by a current transmission. The operations at 1305 may be performed according to the methods described herein. In certain examples, aspects of the operations at 1305 may be performed by a transmitter as described with reference to FIGS. 4 through 7.

At 1310 the UE 115 may evaluate a characteristic associated with the first link or the second link, after transmitting the first PHR. UE 115 may, for example, identify a type of data scheduled for transmission. Additionally or alternatively, UE 115 may identify a transmission duration of data scheduled for transmission. In some cases, UE 115 may identify also a priority of data scheduled for transmission. The operations at 1310 may be performed according to the methods described herein. In certain examples, aspects of the operations at 1310 may be performed by an evaluation component as described with reference to FIGS. 4 through 7.

At 1315 the UE 115 may adjust a transmit power value transmitted in the first PHR associated with the first link or the second link, or both based on the evaluating. For example, UE 115 may have an assigned transmit power value (e.g., 10 W) for the first base station and have a second assigned transmit power value (e.g., 8 W) for the second base station. Based on evaluating the characteristic associated with the first link or the second link, UE 115 may identify that it has higher priority data scheduled for transmission on the first link. As a result, UE 115 may adjust the assigned transmit power value for the first base station, e.g., from 10 W to 12 W. Similarly, UE 115 may adjust the assigned transmit power value for the second base station, e.g., from 8 W to 6 W. The operations at 1315 may be performed according to the methods described herein. In certain examples, aspects of the operations at 1315 may be performed by a power adjustment component as described with reference to FIGS. 4 through 7.

At 1320 the UE 115 may transmit an adjusted PHR to the first base station or the second base station, or both based on the evaluating. The operations at 1320 may be performed according to the methods described herein. In certain examples, aspects of the operations at 1320 may be performed by a transmitter as described with reference to FIGS. 4 through 7.

At 1325 the UE 115 may receive from the first base station or the second base station, or both an UL grant including radio resources based on the adjusted PHR. The operations at 1325 may be performed according to the methods described herein. In certain examples, aspects of the operations at 1325 may be performed by a receiver as described with reference to FIGS. 4 through 7.

Figure 14:
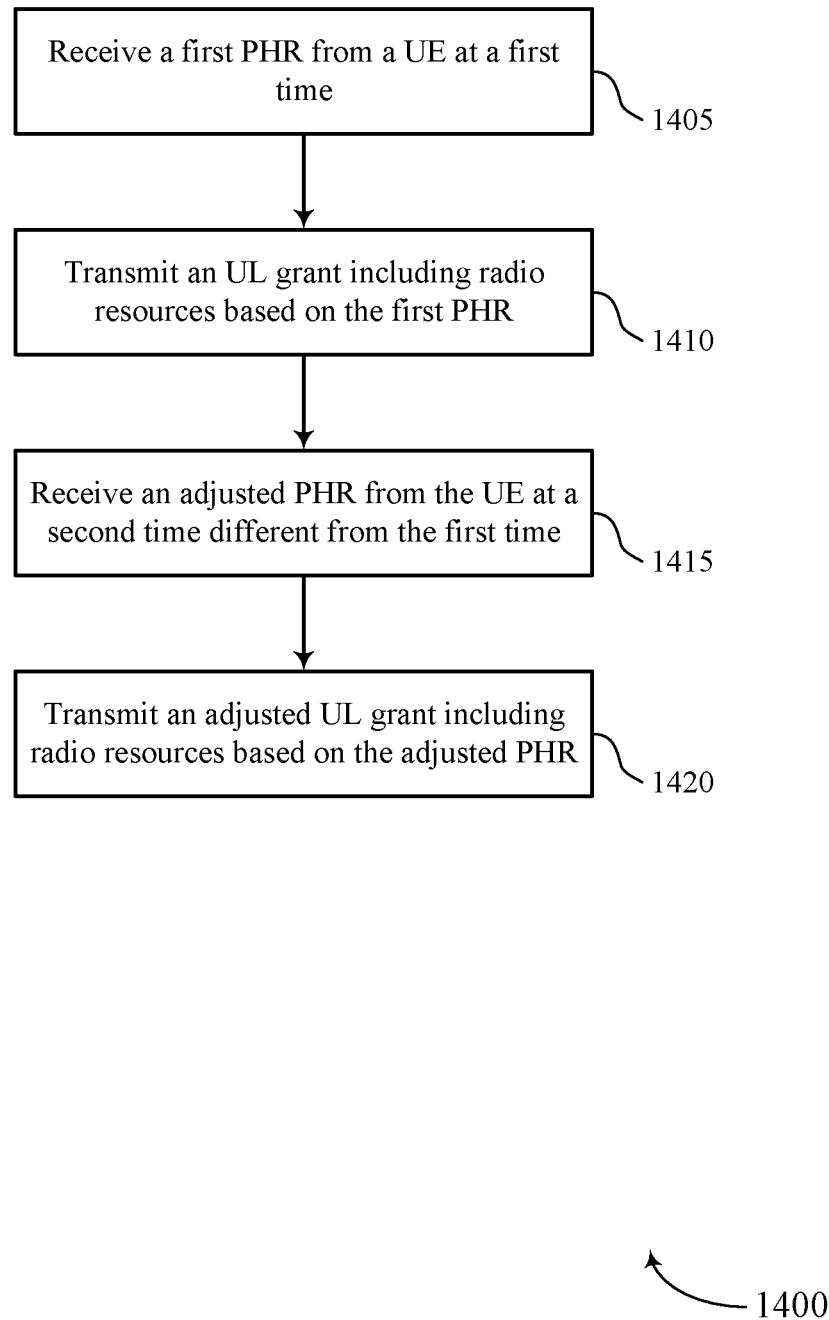

FIG. 14 shows a flowchart illustrating a method 1400 for PHR for UL split bearer communications, in accordance with one or more aspects of the present disclosure. The operations of method 1400 may be implemented by a base station 105 or its components as described herein. For example, the operations of method 1400 may be performed by a base station split bearer PHR manager as described with reference to FIGS. 8 through 10. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may receive a first PHR from a UE at a first time. In some examples, the first time may correlate to a frame or beacon. Additionally or alternatively, the first time may be associated with a subframe of a frame. For example, the first PHR may be a type of MAC CE that may be used to report a power headroom between a current UE transmit power and a nominal power. The first PHR may indicate how much transmission power remains for the UE to use in addition to transmit power being used by a current transmission (e.g., associated with the first PHR transmission). The operations at 1405 may be performed according to the methods described herein. In certain examples, aspects of the operations at 1405 may be performed by a PHR component as described with reference to FIGS. 8 through 10.

At 1410 the base station 105 may transmit an UL grant including radio resources based on the first PHR. Base station 105 may use the first PHR to estimate a remaining UL bandwidth the UE may use for UL transmission. For example, base station 105 may determine an UL bandwidth the UE may use for a subframe, a frame, a beacon, or a combination thereof. The radio resources may include a number of resource blocks. In some examples, the radio resources may be assigned based on the first PHR. In some cases, the base station 105 may not assign radio resources (i.e., bandwidth) to the UE, if the UE does not have enough power headroom. The operations at 1410 may be performed according to the methods described herein. In certain examples, aspects of the operations at 1410 may be performed by a UL grant component as described with reference to FIGS. 8 through 10.

At 1415 the base station 105 may receive an adjusted PHR from the UE at a second time different from the first time. Similarly, the second time may be associated with a subframe of a frame. For example, the adjusted PHR may also be a type of MAC CE. The adjusted PHR may indicate how much transmission power remains for the UE to use in addition to transmit power scheduled for use with an upcoming scheduled transmission. The operations at 1415 may be performed according to the methods described herein. In certain examples, aspects of the operations at 1415 may be performed by a PHR component as described with reference to FIGS. 8 through 10.

At 1420 the base station 105 may transmit an adjusted UL grant including radio resources based on the adjusted PHR. The operations of at 1420 may be performed according to the methods described herein. In certain examples, aspects of the operations at 1420 may be performed by a UL grant component as described with reference to FIGS. 8 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the UL transmissions may also be called reverse link transmissions. Each communication link described herein—including, for example, systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication, comprising:
   transmitting a first power headroom report (PHR) to a first base station on a first link of a split bearer and to a second base station on a second link of the split bearer;
   evaluating a characteristic associated with the first link and the second link after transmitting the first PHR;
   determining a first of the characteristic associated with the first link and a second priority of the characteristic associated with the second link based at least in part on the evaluating;
   adjusting a transmit power value transmitted in the first PHR associated with the first link and the second link based at least in part on determining that the first priority is higher than the second priority; and
   transmitting an adjusted PHR to the first base station and the second base station based at least in part on the adjusting.

2. The method of claim 1, further comprising:
   identifying a type of data scheduled for transmission on at least one of the first link or the second link.

3. The method of claim 2, further comprising:
   configuring an available transmit power value associated with the first link or the second link, or both based at least in part on the identified type of data scheduled for transmission.

4. The method of claim 1, further comprising:
   identifying a transmission duration of data scheduled for transmission on at least one of the first link or the second link.

5. The method of claim 4, further comprising:
   configuring an available transmit power value associated with the first link or the second link, or both based at least in part on the identified transmission duration of data scheduled for transmission.

6. The method of claim 1, further comprising:
   identifying a priority of data scheduled for transmission on at least one of the first link or the second link.

7. The method of claim 6, further comprising:
   configuring an available transmit power value associated with the first link or the second link, or both based at least in part on the identified priority of data scheduled for transmission.

8. The method of claim 7, further comprising:
   generating the adjusted PHR based at least in part on the available transmit power value and a transmit power value condition associated with scheduled data traffic for an upcoming uplink (UL) transmission, wherein transmitting the adjusted PHR is based at least in part on the generating.

9. The method of claim 7, further comprising:
   adjusting a transmit power level associated with the first link or the second link, or both for scheduled data traffic based, at least in part, on the configuring.

10. The method of claim 1, further comprising:
    receiving from at least one of the first base station or the second base station an uplink (UL) grant comprising radio resources based, at least in part, on the adjusted PHR.

11. The method of claim 10 wherein the received UL grant indicates a decrease in allocation of radio resources associated with at least one of the first link or the second link, based at least in part on the adjusted PHR.

12. The method of claim 10, wherein the received UL grant indicates an increase in allocation of radio resources associated with at least one of the first link or the second link, based at least in part on the adjusted PHR.

13. A method of wireless communication at a first base station, comprising:
    receiving a first power headroom report (PHR) from a user equipment (UE) at a first time;
    transmitting an uplink (UL) grant comprising radio resources based at least in part on the first PHR;
    receiving an adjusted PHR from the UE at a second time different from the first time, wherein the adjusted PHR is based at least in part on a first priority of a characteristic associated with a first link between the first base station and the UE and a second priority of the characteristic associated with a second link between a second base station and the UE, wherein the first priority is higher than the second priority; and
    transmitting an adjusted UL grant comprising radio resources based at least in part on the adjusted PHR.

14. The method of claim 13, wherein the adjusted UL grant indicates a decrease in allocation of radio resources associated with the link between the first base station and the UE based at least in part on the adjusted PHR.

15. The method of claim 13, wherein the adjusted UL grant indicates an increase in allocation of radio resources associated with the link between the first base station and the UE based at least in part on the adjusted PHR.

16. An apparatus for wireless communication, comprising:
    a processor;
    memory coupled with the processor; and
    the processor and memory configured to:
      transmit a first power headroom report (PHR) to a first base station on a first link of a split bearer and to a second base station on a second link of the split bearer;
      evaluate a characteristic associated with the first link and the second link after transmitting the first PHR;
      determine a first priority of the characteristic associated with the first link and a second priority of the characteristic associated with the second link based at least in part on the evaluating;
      adjust a transmit power value transmitted in the first PHR associated with the first link and the second link based at least in part on determining that the first priority is higher than the second priority; and transmit an adjusted PHR to the first base station and the second base station based at least in part on the adjusting.

17. The apparatus of claim 16, wherein the instructions are further executable by the processor to cause the apparatus to:
identify a type of data scheduled for transmission on at least one of the first link or the second link.

18. The apparatus of claim 17, wherein the instructions are further executable by the processor to cause the apparatus to:
configure an available transmit power value associated with the first link or the second link, or both based at least in part on the identified type of data scheduled for transmission.

19. The apparatus of claim 16, wherein the instructions are further executable by the processor to cause the apparatus to:
identify a transmission duration of data scheduled for transmission on at least one of the first link or the second link.

20. The apparatus of claim 19, wherein the instructions are further executable by the processor to cause the apparatus to:
configure an available transmit power value associated with the first link or the second link, or both based at least in part on the identified transmission duration of data scheduled for transmission.

21. The apparatus of claim 16, wherein the instructions are further executable by the processor to cause the apparatus to:
identify a priority of data scheduled for transmission on at least one of the first link or the second link.

22. The apparatus of claim 21, wherein the instructions are further executable by the processor to cause the apparatus to:
configure an available transmit power value associated with the first link or the second link, or both based at least in part on the identified priority of data scheduled for transmission.

23. The apparatus of claim 22, wherein the instructions are further executable by the processor to cause the apparatus to:
generate the adjusted PHR based at least in part on the available transmit power value and a transmit power value condition associated with scheduled data traffic for an upcoming uplink (UL) transmission, wherein transmitting the adjusted PHR is based at least in part on the generating.

24. The apparatus of claim 22, wherein the instructions are further executable by the processor to cause the apparatus to:
adjust a transmit power level associated with the first link or the second link, or both for the scheduled data traffic based, at least in part, on the configuring.

25. The apparatus of claim 16, wherein the instructions are further executable by the processor to cause the apparatus to:
receive from at least one of the first base station or the second base station an uplink (UL) grant comprising radio resources based, at least in part, on the adjusted PHR.

26. The apparatus of claim 24, wherein the received UL grant indicates a decrease in allocation of radio resources associated with at least one of the first link or the second link based, at least in part on, the adjusted PHR.

27. The apparatus of claim 24, wherein the received UL grant indicates an increase in allocation of radio resources associated with at least one of the first link or the second link based, at least in part on, the adjusted PHR.

28. An apparatus for wireless communication, comprising:
a processor;
memory coupled with the processor; and
the processor and memory configured to:
receive a first power headroom report (PHR) from a user equipment (UE) at a first time;
transmit an uplink (UL) grant comprising radio resources based at least in part on the first PHR;
receive an adjusted PHR from the UE at a second time different from the first time, wherein the adjusted PHR is based at least in part on a first priority of a characteristic associated with a first link between a first base station and the UE and a second priority of a characteristic associated with a second link between a second base station and the UE, wherein the first priority is higher than the second priority; and
transmit an adjusted UL grant comprising radio resources based at least in part on the adjusted PHR.

29. The apparatus of claim 28, wherein the adjusted UL grant indicates a decrease in allocation of radio resources associated with the link between the first base station and the UE based at least in part on the adjusted PHR.

30. The apparatus of claim 28, wherein the adjusted UL grant indicates an increase in allocation of radio resources associated with the link between the first base station and the UE based at least in part on the adjusted PHR.

* * * * *